US012795018B2

(12) United States Patent
Khatri et al.

(10) Patent No.: US 12,795,018 B2
(45) Date of Patent: Nov. 10, 2026

(54) COMPUTER-IMPLEMENTED SYSTEMS AND METHODS FOR EVALUATING CONTACT CENTER PERFORMANCE USING SIMULATED CONTACT-AGENT PAIRINGS

(71) Applicant: AFINITI AI LIMITED, Dublin (IE)

(72) Inventors: Vikash Khatri, Aldie, VA (US); Blake Jay Riley, Indianapolis, IN (US); Hammad Butt, Islamabad (PK)

(73) Assignee: AFINITI AI LIMITED, Dublin (IE)

( * ) Notice: Subject to any disclaimer, the term of this patent is extended or adjusted under 35 U.S.C. 154(b) by 135 days.

(21) Appl. No.: 18/874,980

(22) PCT Filed: Jun. 15, 2023

(86) PCT No.: PCT/US2023/025364
§ 371 (c)(1),
(2) Date: Dec. 13, 2024

(87) PCT Pub. No.: WO2023/244706
PCT Pub. Date: Dec. 21, 2023

(65) Prior Publication Data

US 2025/0365367 A1 Nov. 27, 2025

Related U.S. Application Data

(60) Provisional application No. 63/471,424, filed on Jun. 6, 2023, provisional application No. 63/352,858, filed on Jun. 16, 2022.

(51) Int. Cl.
*H04M 3/36* (2006.01)
*G06Q 10/0639* (2023.01)
*H04M 3/523* (2006.01)

(52) U.S. Cl.
CPC ........ *H04M 3/362* (2013.01); *G06Q 10/0639* (2013.01); *H04M 3/5232* (2013.01); *H04M 2203/401* (2013.01)

(58) Field of Classification Search
CPC ............. H04M 3/5175; H04M 3/5191; H04M 3/5233; H04M 3/5166; H04M 3/5232; H04M 3/5183; H04Q 3/64
(Continued)

(56) References Cited

U.S. PATENT DOCUMENTS 6,424,709 B1 * 7/2002 Doyle ................ H04M 3/5233 379/265.12
9,300,802 B1 3/2016 Chishti
(Continued)

OTHER PUBLICATIONS

International Application No. PCT/US2023/025362, International Search Report and Written Opinion, mailed Sep. 13, 2023.
(Continued)

*Primary Examiner* — Maria El-Zoobi
(74) *Attorney, Agent, or Firm* — MARSHALL, GERSTEIN & BORUN LLP

(57) ABSTRACT

Computer-implemented systems and methods are disclosed for simulating contact-agent pairings and analyzing contact center performance based on the simulated contact-agent pairings. An exemplary method includes obtaining a first set of available contacts and available agents; determining a first contact-agent pairing based on the first set of available contacts and available agents and a first pairing strategy; and establishing a first connection between a first agent device and a first contact device for the first contact-agent pairing. The exemplary method further includes storing a first set of pairing data corresponding to the first contact-agent pairing; generating, by a simulation model implementing a simulated pairing algorithm, a second contact-agent pairing based on the first set of available contacts and available agents and a second pairing strategy; and storing a second pairing data corresponding to the second contact-agent pairing.

20 Claims, 7 Drawing Sheets

(58) Field of Classification Search
USPC .............................................................. 379/9
See application file for complete search history.

(56) References Cited

U.S. PATENT DOCUMENTS

| | | | | |
|---|---|---|---|---|
| 9,378,475 | B2 * | 6/2016 | Gnanasambandam | G06Q 10/063112 |
| 9,930,180 | B1 | 3/2018 | Kan et al. | |
| 10,257,354 | B2 | 4/2019 | Chishti | |
| 10,348,900 | B2 * | 7/2019 | Chishti | H04M 3/5232 |
| 2002/0184069 | A1 * | 12/2002 | Kosiba | G06Q 10/06315 705/7.38 |
| 2005/0288984 | A1 * | 12/2005 | Hamilton | G06Q 10/063 705/7.11 |
| 2010/0054453 | A1 * | 3/2010 | Stewart | H04M 3/5232 379/265.12 |
| 2012/0051537 | A1 * | 3/2012 | Chishti | H04M 3/5233 379/265.11 |
| 2014/0177821 | A1 | 6/2014 | Ristock et al. | |
| 2019/0356774 | A1 | 11/2019 | Kulkarni et al. | |
| 2020/0382645 | A1 | 12/2020 | Chishti | |
| 2021/0058516 | A1 | 2/2021 | Kan et al. | |
| 2021/0195026 | A1 | 6/2021 | Chishti | |
| 2021/0241198 | A1 | 8/2021 | Chishty et al. | |
| 2021/0243305 | A1 | 8/2021 | Chishty et al. | |
| 2023/0060869 | A1 * | 3/2023 | Harris | G06Q 20/4016 |

OTHER PUBLICATIONS

International Application No. PCT/US23/25364, International Search Report and Written Opinion, mailed Oct. 19, 2023.

* cited by examiner

Simulation Method
400

Simulation Method
500

COMPUTER-IMPLEMENTED SYSTEMS AND METHODS FOR EVALUATING CONTACT CENTER PERFORMANCE USING SIMULATED CONTACT-AGENT PAIRINGS

RELATED APPLICATIONS

This application claims the benefit of U.S. Provisional Application No. 63/471,424 (filed on Jun. 6, 2023) and U.S. Provisional Application No. 63/352,858 (filed on Jun. 16, 2022). The entirety of each of the foregoing provisional applications is incorporated by reference herein.

FIELD OF THE DISCLOSURE

The present disclosure generally relates to computer-implemented systems and methods within contact centers, and more particularly, to computer-implemented systems and methods within contact centers for simulating contact-agent pairings and analyzing contact center performance based the simulated contact-agent pairings.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In some contact centers, contacts or agents are assigned into different "skill groups" or "queues" prior to applying a FIFO assignment strategy within each such skill group or queue. These "skill queues" may also incorporate strategies for prioritizing individual contacts or agents within a baseline FIFO ordering. For example, a high-priority contact may be given a queue position ahead of other contacts who arrived at an earlier time, or a high-performing agent may be ordered ahead of other agents who have been waiting longer for their next call. Regardless of such variations in forming one or more queues of callers or one or more orderings of available agents, contact centers typically apply FIFO to the queues or other orderings. Once such a FIFO strategy has been established, assignment of contacts to agents is automatic, with the contact center assigning the first contact in the ordering to the next available agent, or assigning the first agent in the ordering to the next arriving contact. In the contact center industry, the process of contact and agent distribution among skill queues, prioritization and ordering within skill queues, and subsequent FIFO assignment of contacts to agents is typically managed by a system referred to as an "Automatic Call Distributor" ("ACD").

Moreover, some contact centers may use a "performance based routing" or "PBR" algorithm or approach to ordering the queue of available agents or, occasionally, contacts. For example, when a contact arrives at a contact center with a plurality of available agents, the ordering of agents available for assignment to that contact would be headed by the highest-performing available agent (e.g., the available agent with the highest sales conversion rate, the highest customer satisfaction scores, the shortest average handle time, the highest performing agent for the particular contact profile, the highest customer retention rate, the lowest customer retention cost, the highest rate of first-call resolution). PBR ordering strategies attempt to maximize the expected outcome of each contact-agent interaction but do so typically without regard for utilizing agents in a contact center uniformly. Consequently, higher-performing agents may receive noticeably more contacts and feel overworked, while lower-performing agents may receive fewer contacts and idle longer, potentially reducing their opportunities for training and improvement as well as potentially reducing their compensation.

Still further, a contact center may also use behavioral pairing (BP) strategies or algorithms for assigning contacts to agents. BP algorithms target a balanced utilization of agents within queues (e.g., skill queues) while simultaneously improving overall contact center performance potentially beyond what FIFO or PBR algorithms will achieve in practice. BP improves performance by assigning agent and contact pairs in an algorithmic approach that takes into consideration the assignment of potential subsequent agent and contact pairs such that when the benefits of all assignments are aggregated, they may exceed those of FIFO and PBR strategies. In some cases, BP results in instant contact and agent pairings that may be the reverse of what a FIFO or a PBR algorithm would indicate. For example, in an instant case, a BP algorithm might select the shortest-waiting contact or the lowest-performing available agent. A BP algorithm implements posterity inasmuch as the system allocates contacts to agents in a manner that inherently forgoes what may be the highest-performing selection at the instant moment if such a decision increases the probability of better contact center performance over time.

Contact centers generally desire to optimize their contact-agent pairings and may decide to compare various strategies to determine an optimal pairing strategy. Benchmarking is one solution to perform such a comparison, where a new or different pairing strategy is used alternately with an incumbent pairing strategy. Benchmarking typically follows an epoch or in-line approach, whereby different pairing strategies are implemented at different times to approach a consensus regarding an optimal pairing strategy, of those tested. An epoch-based benchmarking may switch between two different pairing strategies at set times during operation of the contact center, and an in-line-based benchmarking may switch between two different pairing strategies (e.g., FIFO and BP) at random times during operation of the contact center.

Further, contact centers are necessarily extremely dynamic environments and alternating pairing strategies may miss statistically significant effects that are only present while one pairing strategy is being used, thereby polluting the measurement of that pairing strategy respective to the measurement of the other pairing strategy. In conventional contact center tracking, an outcome may be recorded with the agent and contact that were actually paired. There may be other separate logs in other databases tracking agent login/logout/availability events, and similarly for the contact(s). However, creating a contact center state database tracker based on these separate logs is infeasible due to the extensive time and computational resources required and the error-prone nature of such logs. For example, conventional outcome databases do not include information about what other contact-agent pairings may have occurred instead of the contact-agent pairing that was actually selected. This issue is further exacerbated for contact-agent pairings that do not result in an outcome and are not tracked in the outcomes database.

SUMMARY OF THE DISCLOSURE

Accordingly, there is a need for computer-implemented systems and methods within contact centers for efficiently determining which pairing algorithm, approach or strategy to implement, and at what times, days, periods of time, or otherwise instances during which to implement one or more of the algorithms, approaches, or otherwise strategies for the contact center. The present disclosure generally relates to computer-implemented systems and methods implemented for contact centers. In particular, computer-implemented systems and methods are disclosed for simulating contact-agent pairings and analyzing contact center performance based on the simulated contact-agent pairings, such that the systems and methods of the present disclosure provide a real-time mechanism to track what other contact-agent pairing may have occurred if a second pairing strategy were used instead of a first pairing strategy that was used to actually determine pairings.

The present disclosure relates to evaluating performance of one or more pairing strategies, such as a new discovered pairing strategies(s) or new insights for existing pairing strategies, as determined for a contact center, based on simulations that comprise simulated sequences of contact-agent pairings. For example, a contact center of the present disclosure may establish a live connection between a first agent device and a first contact device, and may store a first set of pairing data corresponding to this first contact-agent pairing. The contact center may also generate a second contact-agent pairing based on the first set of available contacts and available agents and a second pairing strategy using a simulation model, and may store a second set of pairing data corresponding to this second contact-agent pairing. The sets of pairing data may generally include, for example, contact identifier(s), agent identifier(s), pairing strategy identifier(s), outcome indicator(s), and/or other suitable data or combinations thereof. From the sets of pairing data, the contact center may further determine a performance measurement corresponding to the performance of the underlying pairing strategies. Thus, the systems and methods of the present disclosure may determine simulated contact-agent pairings in real-time and/or simultaneously with a live pairing strategy to thereby determine the effectiveness of these pairing strategies.

Benefits arise from simulating and/or testing various contact-agent pairing strategies for a given contact center system, which may be specifically configured (with different hardware), and for certain dates or times, such as a holidays (e.g., Independence Day, Memorial Day, holiday season, or the like). For example, a contact center, and its underlying systems, operations, or other aspect of the contact center in general, may experience a performance increase from implementation from one or more of the different pairing algorithms, approaches, or otherwise strategies. Still further, and in a similar manner, a contact center may experience a performance increase for certain times of the day (e.g., early hours) from implementation from one or more of the different algorithms, approaches, or otherwise strategies for different time periods. For example, such differences in performance come from differences in the number of contacts in queue at the contact center, number of agents in queue at the contact center, or otherwise overall load on the contact center in volume of calls being handled at any given time. Other differences in performance may also include an increased number of transactions completed over a certain period of time, an increase in transactions (e.g., sales) amount, or a percentage sales increase, or the like.

In accordance with various aspects herein, a computer-implemented method is disclosed for simulating contact-agent pairings and analyzing contact center performance based on the simulated contact-agent pairings. The computer-implemented method may comprise: obtaining, at a first time by one or more processors communicatively coupled to a contact center system configured to distribute electronic inbound or outbound contacts, a first set of available contacts and available agents; determining, by the one or more processors, a first contact-agent pairing based on the first set of available contacts and available agents and a first pairing strategy; establishing, by the one or more processors, a first connection between a first agent device and a first contact device for the first contact-agent pairing; storing, by the one or more processors, a first set of pairing data corresponding to the first contact-agent pairing; generating, by a simulation model implementing a simulated pairing algorithm as executing on the one or more processors, a second contact-agent pairing based on the first set of available contacts and available agents and a second pairing strategy; and storing, by the one or more processors, a second pairing data corresponding to the second contact-agent pairing.

In certain aspects, the computer-implemented method may further comprise: obtaining, by the one or more processors at a second time different from the first time, a second set of available contacts and available agents; determining, by the one or more processors, a third contact-agent pairing based on the second set of available contacts and available agents and the first pairing strategy; establishing, by the one or more processors, a second connection for the third contact-agent pairing; storing, by the one or more processors, a third set of pairing data corresponding to the third contact-agent pairing; generating, by the simulation model as executing on the one or more processors, a fourth contact-agent pairing based on the second set of available contacts and available agents and the second pairing strategy; storing, by the one or more processors, a fourth set of pairing data corresponding to the fourth contact-agent pairing; and determining, by the one or more processors, a performance measurement of the contact center based on (i) the first set of pairing data, (ii) the second set of pairing data, (iii) the third set of pairing data, and (iv) the fourth set of pairing data.

In certain aspects, the computer-implemented method may further comprise: obtaining, by the one or more processors at a second time different from the first time, a second set of available contacts and available agents; determining, by the one or more processors, a third contact-agent pairing based on the second set of available contacts and available agents and the first pairing strategy; establishing, by the one or more processors, a second connection for the third contact-agent pairing; storing, by the one or more processors, a third set of pairing data corresponding to the third contact-agent pairing; generating, by the simulation model as executing on the one or more processors, (i) a set of hypothetical available contacts and available agents based on the first set of available contacts and agents and the second contact-agent pairing and (ii) a fourth contact-agent pairing based on the set of hypothetical available contacts and available agents and the second pairing strategy; storing, by the one or more processors, a fourth set of pairing data corresponding to the fourth contact-agent pairing; and determining, by the one or more processors, a performance measurement of the contact center based on (i) the first set of pairing data, (ii) the second set of pairing data, (iii) the third set of pairing data, and (iv) the fourth set of pairing data.

In certain aspects, the computer-implemented method may further comprise: recording, by the one or more processors, a first outcome of the first contact-agent pairing before establishing a second connection for a third contact-agent pairing or after establishing the second connection.

In certain aspects, the first contact-agent pairing includes a first contact and a first agent from the first set of available contacts and available agents, and the second contact-agent pairing includes the first contact and the first agent.

In certain aspects, the first contact-agent pairing includes a first contact and a first agent from the first set of available contacts and available agents, and the second contact-agent pairing includes at least one of: (i) a second contact that is different from the first contact or (ii) a second agent that is different from the first agent.

In certain aspects, the first pairing strategy is a behavioral pairing (BP) strategy and the second pairing strategy is a first-in, first-out (FIFO) pairing strategy.

In certain aspects, the computer-implemented method further comprises: determining, by the one or more processors, a performance measurement of the contact center system based on the first set of pairing data and the second set of pairing data.

In certain aspects, the computer-implemented method further comprises: determining, by the one or more processors, a set of historical contact-agent pairings based on one or more connected contact-agent pairings; determining, by the one or more processors, a set of simulated contact-agent pairings based on one or more simulated contact-agent pairings; comparing, by the one or more processors, the set of historical contact-agent pairings and the set of simulated contact-agent pairings; and determining, by the one or more processors, a performance measurement based on the comparing.

In another embodiment, a computer-implemented method for simulating contact-agent pairings and analyzing contact center performance based on the simulated contact-agent pairings is disclosed. The computer-implemented method may comprise: determining, by one or more processors communicatively coupled to a contact center system configured to distribute electronic inbound or outbound contacts, a set of historical contact-agent pairings based on a first pairing strategy, wherein each pairing is associated with a route request of a set of route requests; generating, by a simulation model implementing a simulated pairing algorithm executing on the one or more processors, a set of hypothetical contact-agent pairings for each route request of the set of route requests based on a second pairing strategy, the set of hypothetical contact-agent pairings including at least one hypothetical contact-agent pairing; comparing, by the one or more processors, the set of historical contact-agent pairings and the set of hypothetical contact-agent pairings; and determining, by the one or more processors, a performance measurement based on the comparing.

In certain aspects, the first pairing strategy is a behavioral pairing (BP) strategy and the second pairing strategy is a first-in, first-out (FIFO) pairing strategy.

In yet another embodiment, a system configured to simulate contact-agent pairings and to analyze contact center performance based on the simulated contact-agent pairings is disclosed. The system comprises: one or more processors communicatively coupled to a contact center system configured to distribute electronic inbound or outbound contacts; and computing instructions, configured for execution by the one or more processors, and that when executed by the one or more processors, cause the one or more processors to: obtain, at a first time, a first set of available contacts and available agents, determine a first contact-agent pairing based on the first set of available contacts and available agents and a first pairing strategy, establish a first connection between a first agent device and a first contact device for the first contact-agent pairing, store a first set of pairing data corresponding to the first contact-agent pairing, generate, by a simulation model implementing a simulated pairing algorithm, a second contact-agent pairing based on the first set of available contacts and available agents and a second pairing strategy, and store a second set of pairing data corresponding to the second contact-agent pairing.

In certain aspects, the computing instructions, when executed, further cause the one or more processors to: determine a performance measurement of the contact center based on the first set of pairing data and the second set of pairing data.

In certain aspects, the computing instructions, when executed, further cause the one or more processors to: obtain, at a second time different from the first time, a second set of available contacts and available agents; determine a third contact-agent pairing based on the second set of available contacts and available agents and the first pairing strategy; establish a second connection for the third contact-agent pairing; store a third set of pairing data corresponding to the third contact-agent pairing; generate, by the simulation model, a fourth contact-agent pairing based on the second set of available contacts and available agents and the second pairing strategy; store a fourth set of pairing data corresponding to the fourth contact-agent pairing; and determine an updated performance measurement of the contact center based on (i) the third set of pairing data, (ii) the fourth set of pairing data, and (iii) the performance measurement.

In certain aspects, the computing instructions, when executed, further cause the one or more processors to: obtain, at a second time different from the first time, a second set of available contacts and available agents; determine a third contact-agent pairing based on the second set of available contacts and available agents and the first pairing strategy; establish a second connection for the third contact-agent pairing; store a third set of pairing data corresponding to the third contact-agent pairing; generate, by the simulation model, (i) a set of hypothetical available contacts and available agents based on the first set of available contacts and agents and the second contact-agent pairing and (ii) a fourth contact-agent pairing based on the set of hypothetical available contacts and available agents and the second pairing strategy; store a fourth set of pairing data corresponding to the fourth contact-agent pairing; and determine an updated performance measurement of the contact center based on (i) the third set of pairing data, (ii) the fourth set of pairing data, and (iii) the performance measurement.

In certain aspects, the first contact-agent pairing includes a first contact and a first agent from the first set of available contacts and available agents, and the second contact-agent pairing includes the first contact and the first agent.

In certain aspects, the first contact-agent pairing includes a first contact and a first agent from the first set of available contacts and available agents, and the second contact-agent pairing includes at least one of: (i) a second contact that is different from the first contact or (ii) a second agent that is different from the first agent.

In certain aspects, the first pairing strategy is a behavioral pairing (BP) strategy and the second pairing strategy is a first-in, first-out (FIFO) pairing strategy.

In certain aspects, the computing instructions, when executed, further cause the one or more processors to: determine a performance measurement of the contact center system based on the first set of pairing data and the second set of pairing data.

In certain aspects, the computing instructions, when executed, further cause the one or more processors to: determine a set of historical contact-agent pairings based on one or more connected contact-agent pairings; determine a set of simulated contact-agent pairings based on one or more simulated contact-agent pairings; compare the set of historical contact-agent pairings and the set of simulated contact-agent pairings; and determine a performance measurement based on the comparing.

In accordance with the above, and with the disclosure herein, the present disclosure includes improvements in underlying computer functionality or in improvements to other technologies at least because the present disclosure includes, e.g., determining performance measurements of a call center for improvement thereof. Such performance measurements may correspond to telecommunication connections or computing resources (e.g., memory and/or processor resources) of a call center system comprising computing systems in the field of call center routing, distribution, and/or management. That is, the present disclosure describes improvements in the functioning of an underlying computing system itself or "any other technology or technical field" because a call center, and its underlying call processing hardware and devices, are improved by allowing the call center, and related resources, such as telecommunications connections allocated in the call center system (e.g., telecommunications connections between an agent and a caller) to be routed or established based on algorithms determined from the presently-disclosed simulated sequences of contact-agent pairings and/or performance measurements determined therefrom. This provides an improvement over prior systems that do not implement such simulations to determine performance measurements, as described herein. For example, such implementation improves over the prior art at least because a contact center, as improved based on insights from performance measurements as described herein, allow the systems and methods of the contact center to operate with limited or reduced resources (e.g., limited or fewer telecommunication connections and/or limited or reduced processing or memory utilization of a call processing system) or experience increased performance (e.g., transaction completion or sales) compared with non-optimizing systems. Limited or fewer telecommunication connections and/or limited or reduced processing or memory utilization of a call processing system are provided because the presently-disclosed implementation efficiently determines contact center operation through simulation instead of through consuming live resources.

Performance of a given contact center, and related metrics, may be measured or determined in terms of the resources, such as computer memory, processing, connections, whether networking or telephonic connections, of the contact center. Other performance measurements, such as number of agents (and therefore networking or telephonic connections required), number of transactions completed over a certain period of time, percentage sales increase(s), and/or other suitable measurements may be similarly measured or determined by the simulation. For example, pairing an agent of the contact center to a contact comprises establishing a telecommunication connection to provide voice communication between the agent and the contact. Such pairing requires not only telephonic connections, but may also require processor, memory, and networking connection and/or bandwidth of the contact center and the contact. The simulation may be used to measure and determine performance measurements of such resources, in order to, for example, compare and reduce resource requirements for more efficient pairing algorithms or otherwise contact-agent pairing sequences. e.g., as determined for certain times, dates, or otherwise for the contact center. In addition, the simulation may also identify increased transaction (e.g., sales) performance for the contact center. In various aspects, the contact center may be updated to execute or implement pairing strategies as determined from a simulation, e.g., as determined by a simulation model as described herein.

Additionally or alternatively, the present disclosure relates to improvements to other technologies or technical fields at least because a synthetic sequence of contact-agent pairings may be manipulated or created in order to test a particular ordering or sequence of actual contact-agent pairings. In such aspects, the synthetic sequence of contact-agent pairings can be used to test, such as stress test or load balance, a contact center system. In addition, such manipulated or created contact-agent pairings may be used to test one or more performance measurements of a contact center system. In this way, the synthetic sequence of contact-agent pairings can be used improve the performance of one or more features of the contact center system, by determination of the performance measurements, for example, by determining which pairing sequence provides an improvement in terms of reduced telecommunication connection usage, reduced memory usage, reduced processing usage, reduced handle time, and/or increased performance of transactions and/or sales, or other benefits to the contact center as described herein.

In addition, the present disclosure includes the application of or use of a particular machine, e.g., one or more switches or routers as deployed in a contact center, call center, or otherwise associated with a service provider, where a switch or router may be configured to operate according to a pairing algorithm as determined by simulation in accordance with the systems and methods for determining, evaluating, and/or otherwise optimizing or improving performance measurements of a contact center as described herein.

Still further, the present disclosure includes specific features other than what is well-understood, routine, conventional activity in the field, because such features add unconventional steps that confine the disclosure to a particular useful application, e.g., computer-implemented systems and methods within contact centers for simulating contact-agent pairings and analyzing contact center performance based the simulated contact-agent pairings.

Advantages will become more apparent to those of ordinary skill in the art from the following description of the preferred aspects which have been shown and described by way of illustration. As will be realized, the present aspects may be capable of other and different aspects, and their details are capable of modification in various respects. Accordingly, the drawings and description are to be regarded as illustrative in nature and not as restrictive.

The present disclosure will now be described in more detail with reference to particular aspects thereof as shown in the accompanying drawings. While the present disclosure is described below with reference to particular aspects, it should be understood that the present disclosure is not limited thereto. Those of ordinary skill in the art having access to the teachings herein will recognize additional implementations, modifications, and aspects, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

Figure 1:
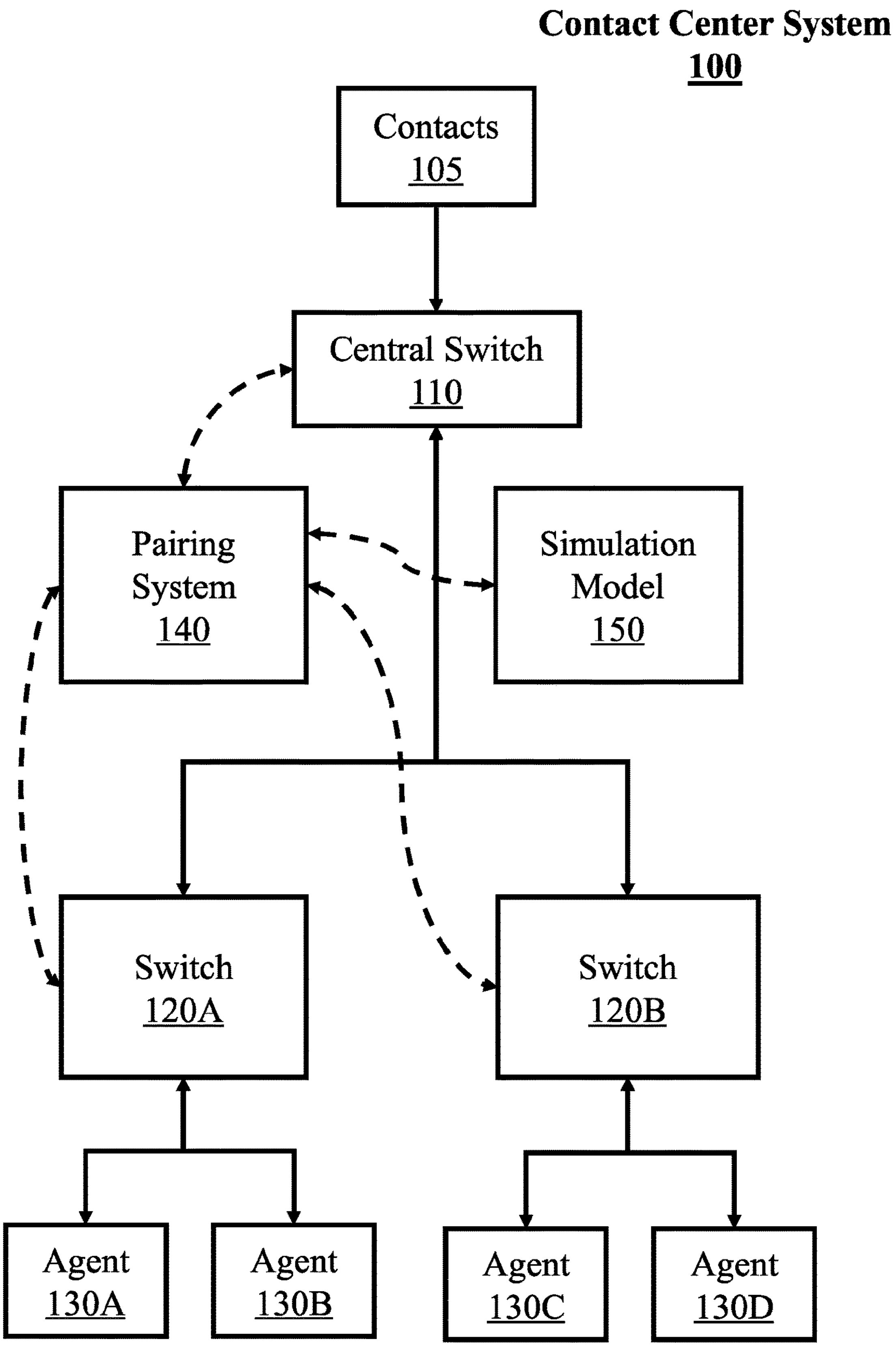
FIG. 1 depicts a block diagram of a contact center system, in accordance with various aspects of the present disclosure.

FIG. 1 depicts a block diagram of a contact center system 100, in accordance with various aspects of the present disclosure. As illustrated by the contact center system 100 of FIG. 1, the systems and methods herein comprise network elements, computers, and/or computing instructions for simulating contact center systems that may include one or more modules. As used herein, the term "module" may be understood to refer to computing software, instructions, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the contact center system may include a central switch 110. The central switch 110 may receive incoming contacts 105 (e.g., callers) or support outbound connections to contacts via a dialer, a telecommunications network, or other modules (not shown). The central switch 110 may include contact routing hardware and software for helping to route contacts among one or more contact center systems, or to one or more Private Branch Exchanges (PBXs) and/or Automated Call Distribution (ACD) systems or other queuing or switching components within a contact center. The PBX and/or ACD may manage, route, or otherwise distribute calls based on one or more distribution rules, such as the number called, line, timetable, and other parameters, which are configurable to dynamically update or change the operation of the contact center. The rules of the PBX and/or ACD, or more generally the operation of the PBX and/or ACD, may be modified, updated, or otherwise configured by pairing system 140 and/or the simulation model 150.

In some aspects, the central switch 110 may not be necessary if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B. It is to be understood, however, that additional or fewer agents may be allocated or otherwise associated with a given switch or router within a contact center system.

In various aspects, the contact center system 100 may also be communicatively coupled to a pairing system 140. Pairing system 140 may comprise a computing system including one or more processors, one or more memories, and related computing instructions for execution of software or instructions as described herein. In some aspects, pairing system 140 may be integrated as part of the contact center system 100, such as integrated into an existing computing device, switch, or router of the contact center. That is, in some aspects, pairing system 140, may be embedded within a component of a contact center system (e.g., embedded in or otherwise integrated with a switch). Additionally, or alternatively, pairing system 140 may be a separate computing system (e.g., such as a computing device as provided by a third party) that is connected via a computer network of the contact center. That is, in some aspects, switches of the contact center system 100 may be communicatively coupled to pairing system 140 via a network or otherwise cable connection, and, in some aspects, may include multiple pairing systems like pairing system 140. In the example of FIG. 1, pairing system 140 is communicatively coupled to one or more switches in the switch system of the contact center system 100, including central switch 110, contact center switch 120A, and contact center switch 120B.

Pairing system 140 may receive information (i.e., contact center data, such as event data of the contact center, or other information of the contact center) from a PBX/ACD of the contact center system 100 and/or a switch (e.g., contact center switch 120A) of the contact center system 100 about agents logged in to the switch or otherwise into the contact center system 100 (e.g., agents 130A and 130B) and about incoming contacts. In some aspects, such information may be received via another switch (e.g., central switch 110) or, in some aspects, from a network (e.g., the Internet or a telecommunications network) (not shown).

As the term is used herein, contact center event data refers to electronic information defining events of the contact center. Contact center event data comprises contact data and agent data. For example, contact event data may refer to event data regarding contacts, such as a contact arriving or otherwise connecting at a contact center, a contact leaving or otherwise disconnecting from the contact center, or a contact's interactions with the contact center, which may include the contact's pairing by the pairing system, interactions with an agent, selections made (e.g., such as menu selections from a number phone menu or other selection interface causing the contact to be routed or directed in one or more ways within the call routing network or other network of the contact center system), decisions made by the contact during the contact's interaction with an agent of the contact center system, or any other event that defines interaction or status of the contact with the contact center. Similarly, as a further example, agent event data may refer to event data regarding agents, such as an agent logging into or otherwise connecting at a contact center, an agent logging out or otherwise disconnecting from the contact center, or an agent's interactions with the contact center, which may include the agent's pairing by the pairing system, interactions with a contact, selections made (e.g., such as menu selections from a menu while the agent handles or otherwise interacts with a contact), decisions made by the agent during a contact-agent pairing, or any other event that defines interaction or status of the agent with the contact center.

The pairing system 140 may process this information to determine which contacts should be paired (e.g., matched, assigned, distributed, or otherwise routed within contact center system 100) with which agents. That is, pairing system 140, or more generally contact center system 100, is configured to algorithmically assign contacts arriving at the contact center to agents available to handle those contacts. At times, the contact center may be in an "L1 state" as defined by a state where contact center 100 has agents available and waiting for assignment to inbound or outbound contacts (e.g., telephone calls, Internet chat sessions, email). At other times, the contact center may be in an "L2 state" (i.e., an L2 queue) as defined by a state where contact center 100 has contacts waiting in one or more queues for an agent to become available for assignment. Such L2 queues could be inbound, outbound, or virtual queues.

Contact center system 100 may be configured to implement various strategies for assigning contacts to agents in both L1 and L2 states. Pairing system 140 is configured to select, modify, and/or switch between or among the various strategies or otherwise pairing algorithms based on one or more parameters or states of the contact center system 100. For example, in one aspect, multiple agents may be available and waiting for connection to a contact (i.e., contact center system 100 is in an L1 state), and a contact arrives at the contact center via a network or central switch. If the contact center system 100 and/or pairing system 140 is implementing a FIFO strategy or otherwise algorithm, the contact center system 100 may automatically distribute the new contact to whichever available agent has been waiting the longest amount of time for an agent. As a further example, if a contact center system 100 or pairing system 140 is implementing a BP strategy, the contact center system 100 may optimally assign contacts to agents using specific information about either tasks or agents, or both.

When contact center system 100 is in an L2 state, multiple contacts are available and waiting for connection to an agent. These contacts may be queued in a contact center switch such as a PBX or ACD device ("PBX/ACD"). If the contact center system 100 and/or pairing system 140 is implementing a FIFO strategy or otherwise algorithm, the contact center system 100, pairing system 140, and/or contact center switch will typically connect a newly available agent to whichever contact has been waiting on hold in the queue for the longest amount of time. Further, for an L2 state, and where the contact center system 100 and/or pairing system 140 is implementing a BP strategy or otherwise algorithm, the contact center system 100 and/or pairing system 140, the contact center system 100 may optimally assign agents to contacts using specific information about either tasks or agents, or both.

A simulation model 150 may be linked to pairing system 140, and may receive and transmit event data, information, and pairing algorithms for testing and controlling operation of the contact center system 100, which may be based on simulated pairing algorithms and sequences, for example, as described herein. Simulation model 150 may comprise computing instructions stored in memory and configured to execute one or more processors within, or communicatively coupled to, contact center system 100 and pairing system 140. In various aspects, simulation model 150 may be implemented by a separate computing device (e.g., a server) communicatively connected (e.g., via a network or cable connection) to pairing system 140. Alternatively, simulation model 150, may be integrated with (e.g., stored in memory with or as part of a set of computing instructions or application with) pairing system 140.

In some aspects, simulation model 150 may comprise computing instructions that pair or otherwise execute or implement a pairing algorithm. For example, in various aspects, simulation model 150 may be configured to implement a pairing strategy as would be executed for the same configuration (e.g., having the same equipment or hardware, e.g., central switch 110, etc.) of the contact center system 110. Simulation may occur with simulated event data and, at least initially, may not affect pairing of actual (live) contacts and agents within the contact center system. That is, simulations may be performed separate from, or offline to, the actual or live operation of the contact center. Additionally, or alternatively, such simulations may be performed externally to (e.g., via external simulation model 225 as described for FIG. 2A and/or FIG. 2B) or internally at (via internal simulation model 295 as described for FIG. 2A and/or FIG. 2B) a contact center system (e.g., contact center system 100 and/or contact center system 200) as described herein.

Additionally, or alternatively, simulation model 150 may comprise a machine learning model. For example, simulation model 150 may include a machine learning model, or algorithm for training a machine learning model, that is configured to input contact center data, such as contact information, agent information, or event data defining sequences or timing therefor, and/or one or more pairing strategies or algorithms of the contact center system (e.g., contact center system 100) in order predict, classify, or determine contact-agent pairings and/or performance measurements of the contact center as described herein. Performance measurements may include any one or more of telecommunication connection utilization of the contact center, a resource utilization of the contact center, a contact resolution metric associated with one or more contacts, or a transaction metric associated with one or more contacts, or other performance measurement as described herein.

The simulation model 150 may be trained to determine improvements to any one of these performance measurements based on different sequences of contacts, agents, and/or pairing strategy currently utilized by the contact center system (e.g., contact center system 100). In various aspects, a machine learning model of simulation model 150 may be trained using a supervised or unsupervised machine learning program or algorithm. The machine learning program or algorithm may employ a neural network, which may be a deep learning neural network. In some aspects, the artificial intelligence and/or machine learning based algorithms, as used to train simulation model 150, may be included as a library.

Machine learning as applied to simulation model 150 may involve identifying and recognizing patterns in existing data, such as contact center data or related event data (e.g., arrival time(s) of contact(s) or availability of agent(s)), in order to facilitate making predictions or identification for subsequent data (such as determining contact-agent pairings, performance measurements of the contact center system, etc.). For example, a machine learning model, such as the machine learning model of simulation model 150 as described herein, may be created and trained based upon training data (e.g., data or information regarding contacts, agents, arrival times, log in or log out times, handle times, sales or transaction information, telecommunication connection status or utilization, memory or processor resource utilization of the contact center system, or other information or data described herein) as inputs or data (which may be termed "features" and "labels") in order to make valid and reliable predictions for new inputs, such as testing level or production level data or inputs (e.g., for determining contact-agent pairings and/or performance measurements of the contact center).

In supervised machine learning, a machine learning program operating on a server, computing device, or otherwise processors, may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processors as described herein, to predict or classify, based on the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides a compressed representation of data or inputs, or otherwise a classification, when given test level or production level data or inputs, is generated.

Supervised learning and/or unsupervised machine learning may also comprise retraining, relearning, or otherwise updating models with new, or different, information, which may include information received, ingested, generated, or otherwise used over time. The disclosures herein may use one or both of such supervised or unsupervised machine learning techniques.

It is to be understood that simulation model 150 may be used to determine simulated contact-agent pairing sequences and/or related performance measurements, using artificial intelligence (e.g., a machine learning model of simulation model 150) or, in alternative aspects, without using artificial intelligence. More generally, simulations (whether using artificial intelligence or not) may be performed to test, measure, or otherwise determine pairing strategies for the contact center (e.g. contact center system 100) to determine performance measurements of the contact center as described herein. The simulations performed by simulation model may be used to update or configure the pairing system 140 to operate according to a new or different pairing algorithm that was determined based on a simulated pairing algorithm as tested, determined, or measured by simulation model 150. In such instances, the new or different pairing algorithm may be uploaded, transmitted, or otherwise provided to pairing system 140 (e.g., via a computer network or via a computer bus), where the pairing system 140 may cause the contact center system (e.g., via configuration of one or more switches, the PBX, or ACD, etc.) to begin to execute or implement the new or different pairing algorithm.

Figure 2A:
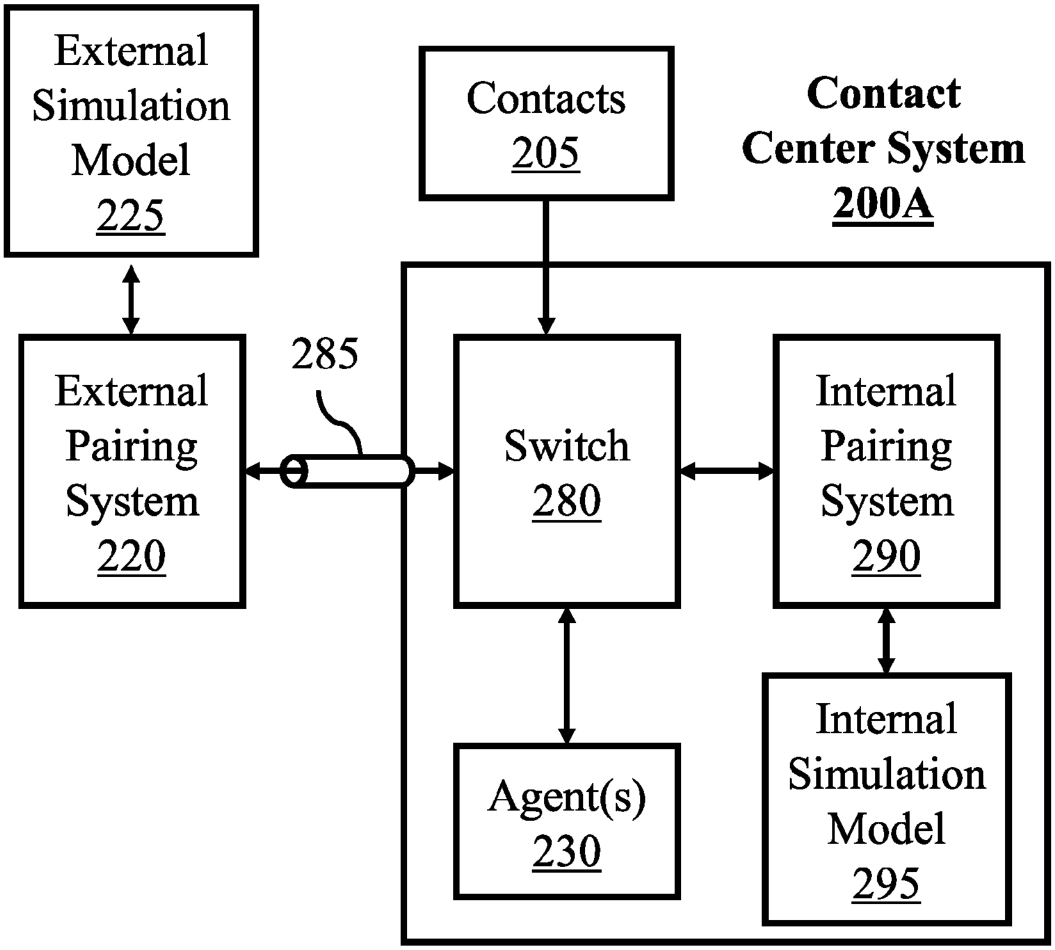
FIG. 2A depicts a block diagram of a contact center system with an external pairing system, in accordance with various aspects of the present disclosure.

FIG. 2A depicts a block diagram of a contact center system 200A with an external pairing system 220, in accordance with various aspects of the present disclosure. Contact center system 200A represents an additional, or alternative, configuration of a contact center system compared to contact center system 100. It is to be understood, however, that the disclosure provided herein for contact center system 100 with respect to routing and pairing contacts applies to contact center system 200A. In contact center system 200A, a contact center system 200A may route contacts 205 to a plurality of agents 230. The contact center system 200A may include routing hardware and software, such as switch 280 and/or one or more PBX or ACD routing components or other queuing or switching components for helping to route the plurality of contacts 205 among the plurality of agents 230.

In the contact center system 200A, an internal pairing system 290 may be communicatively coupled to the contact center system 200A. The internal pairing system 290 may be native to (or built in) the contact center system 200A (i.e., "first-party") or may be provided by a third-party vendor. Typically, the internal pairing system 290 may implement traditional pairing strategies (e.g., FIFO) or some other pairing strategy that may be proprietary to the contact center system 200A. However, the internal pairing system 290 may also comprise the pairing system 140 as described for FIG. 1. The internal pairing system 290 may receive or otherwise retrieve information from the contact center system 200A about the agents 230 logged into the contact center system 200A and about the incoming contacts 205.

In the contact center system 200A, external pairing system 220 may be communicatively coupled to the contact center system 200A via an interface 285. Interface 285 may isolate the contact center system 200A from the external pairing system 220 (e.g., for security purposes), and control or otherwise allow information exchanged between the two systems. An example of the interface 285 may be a public or a private proprietary application programming interface (API), such as a Representational State Transfer (RESTful)

API, provided over a network (e.g., the Internet or a telecommunications network) (not shown).

With further reference to FIG. 2A, the simulation models 225, 295 may be configured to be external or internal to the contact center system 200A, and may be further configured to generate simulation sequences of contact-agent pairings, determine one or more performance measurements of the contact center based on the simulated sequences of contact-agent pairings, update the operation of the contact center based on one or more simulations, or perform other such operations as provided by simulation models, as described herein. For example, internal simulation model 295 is communicatively coupled to internal pairing system 290. In some aspects, internal simulation model 295 may be a separate application, computer program, or otherwise set of computing instructions from the internal pairing system 290. In such aspects, internal simulation model 295 may interact with or communicate with the internal pairing system 290 via an API or otherwise through data exchange. Additionally, or alternatively, internal simulation model 295 may be integrated with, or be part of, internal pairing system 290.

More generally, internal simulation model 295 comprises computing instructions, program code, one or more data structures (e.g., a neural network) that is integrated with, or is accessible to, internal pairing system 290. In various aspects, internal pairing system 290 may comprise computing instructions that interact with, or access, via input and output, internal simulation model 295. For example, internal pairing system 290 may provide data (e.g., contact and agent data) to internal simulation model 295 and may receive output (e.g., simulated contact-agent pairings, performance measurements) for updating operation of contact center 200A to operate in accordance with pairing algorithms determined from simulation by the internal simulation model 295.

External simulation model 225 may be communicatively coupled to external pairing system 220. In some aspects, external simulation model 225 may be a separate application, computer program, or otherwise set of computing instructions from the external pairing system 220. In such aspects, external simulation model 225 may interact with or communicate with the external pairing system 220 via an API or otherwise through data exchange. Additionally, or alternatively, external simulation model 225 may be integrated with, or be part of, external pairing system 220. Still further, external simulation model 225 may be communicatively coupled to the contact center system 200A through external pairing system 220 via interface 285.

Additionally, or alternatively, external simulation model 225 may directly connected (not shown) to contact center system, for example, through interface 285. External simulation model 225 may communicate with contact center system 200A via interface 285 to update operation (e.g., based on a simulated pairing algorithm) or otherwise allow information exchanged between the external simulation model 225 and the contact center system 200A. An example of the interface 285 may be a public or a private proprietary application programming interface (API), such as a Representational State Transfer (RESTful) API, provided over a network (e.g., the Internet or a telecommunications network) (not shown). The API may be the same or a different (API) as used by the external pairing system 220 for communicating with contact center system 200A.

External simulation model 225 comprises computing instructions, program code, one or more data structures (e.g., a neural network) that may be integrated with, or is accessible to, external pairing system 220. In various aspects, external pairing system 220 may comprise computing instructions that interact with, or access, via input and output, external simulation model 225. For example, external pairing system 220 may provide data (e.g., contact and agent data, or related event data) to external simulation model 225 and may receive output (e.g., simulated contact-agent pairings, performance measurements) for updating operation of contact center 200A to operate in accordance with pairing algorithms determined from simulation by the external simulation model 225.

In some aspects, relative to the internal pairing system 290, the external pairing system 220 may have access to less information associated with contact center system 200A, e.g., a limited subset of information that is selected and shared by the contact center system 200A. Similarly, relative to the internal pairing system 290, the external pairing system 220 may have less control over the operation of contact center system 200A. Such information and/or control is nonetheless generally sufficient for the external pairing system 220 to determine the contact-agent pairing and convey the determined contact-agent pairing to contact center system 200A. External pairing system 220 may be provided by a third-party vendor and may be in the form of the pairing system 140 described above. The external pairing system 220 may provide a pairing strategy (e.g., BP strategy) that improves the performance of the contact center system 200A when compared to one or more pairing strategies typically provided by the internal pairing system 290. In some aspects, the external pairing system 220 may also provide the same or a similar one or more pairing strategies as that of the internal pairing system 290.

In some aspects, the contact center system 200A may operate under a shared control, in which the contact center system 200A may send route requests to either or both of the internal pairing system 290 and the external pairing system 220 to determine which contact is to be routed to which agent. The shared control may be desirable, for example, when the internal pairing system 290 employs a traditional or proprietary pairing strategy (e.g., FIFO) that may not be provided by the external pairing system 220, while the external pairing system 220 is used to provide a higher-performing pairing strategy (e.g., a BP pairing strategy or algorithm). In this manner, each of the external pairing system 220 and/or internal pairing system 290 may use fewer resources, such as less memory and/or processing, because external pairing system 220 and internal pairing system 290 may offload or otherwise separate contact-agent pairing computations or determining of a given contact-agent pairing across a networked environment.

When the external pairing system 220 includes the same or a similar pairing strategy as that of the internal pairing system 290, the contact center system 200A may operate under full control such that the contact center system 200A sends all route requests to the external pairing system 220. In other words, the external pairing system 220 has full control on determining every contact-agent pairing. Under the full control, at times, the external pairing system 220 may simulate/mimic the pairing strategy of the internal pairing system 290 (e.g., FIFO) and, at other times, may employ a different pairing strategy (e.g., BP), and send its contact-agent pairing recommendation to the contact center system 200A over the interface 285. The contact center system 200A may then assign the contacts 205 to agents 230 based on the contact-agent pairing recommendation.

Figure 2B:
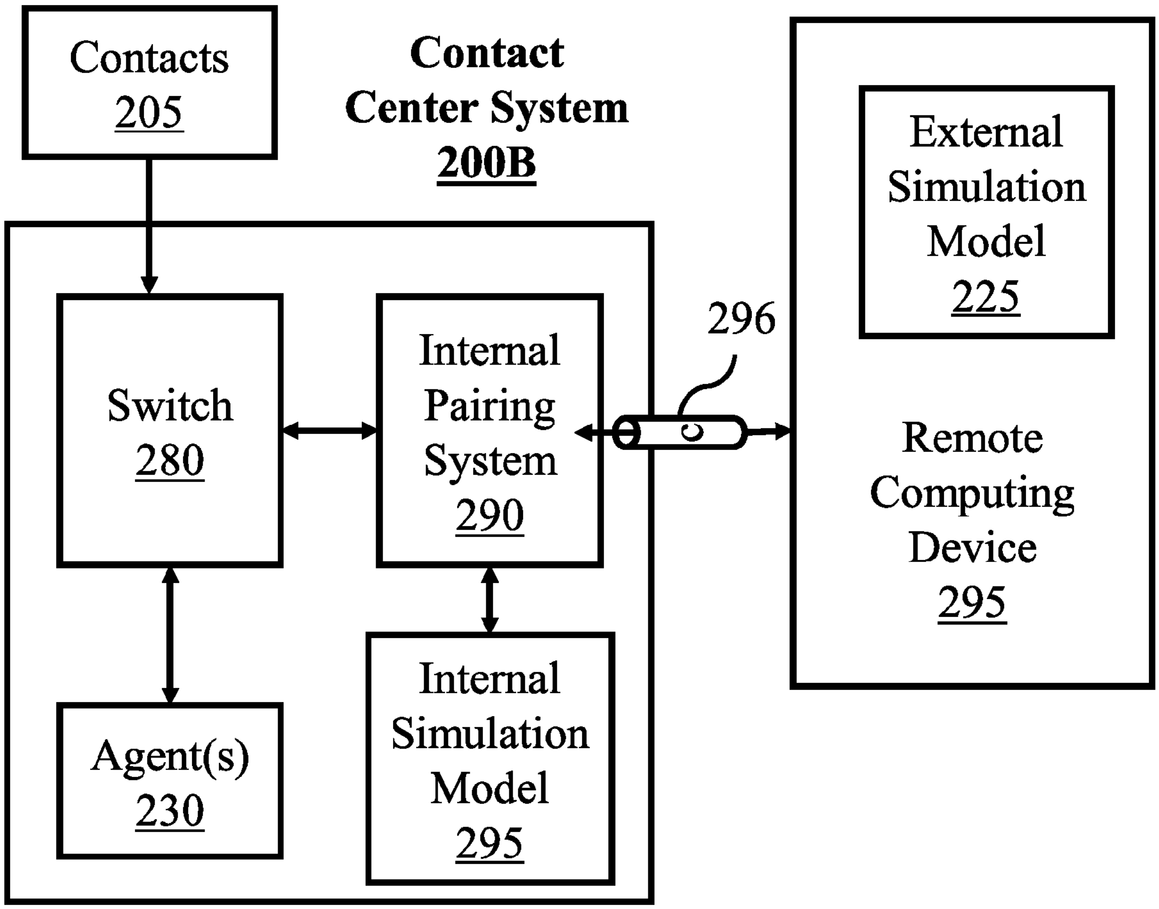
FIG. 2B depicts a block diagram of a contact center system with a remote computing device, in accordance with various aspects of the present disclosure.

In other examples as shown in FIG. 2B, the external simulation model 225 may be part of a remote computing device 295 in contact center 200B. The remote computing device 295 may be connected to the contact center via an interface 296, and control or otherwise allow information exchanged between the internal pairing system 290 and the remote computing device 295. An example of the interface 285 may be a public or a private proprietary application programming interface (API), such as a Representational State Transfer (RESTful) API, provided over a network (e.g., the Internet or a telecommunications network) (not shown). Otherwise, contact center 200B may be similar to contact center 200A. Otherwise, the components of contact center 200B may be as provided regarding the components of contact center 200A.

In some aspects, the performance of the external pairing system 220 may be determined at least in part by a number of contact-agent pairing choices available to the external pairing system 220 at a given point in time. For example, in an L1 environment (agent surplus, one contact; select among multiple available/idle agents), the number of pairing choices corresponds to the number of agents that are available. In an L2 environment (contact surplus, one available/idle agent; select among multiple contacts in queue), the number of pairing choices corresponds to the number of contacts available. In an L3 environment (multiple agents and multiple contacts; select among pairing permutations), the number of pairing choices corresponds to the number of permutations between the number of agents and contacts that are available.

The effect of having a small number of contact-agent pairing choices may be to reduce the performance gains that can be derived from using a higher performing pairing strategy (e.g., BP strategy) relative to a traditional pairing strategy (e.g., FIFO). For example, when one agent and one contact are available, there is a single pairing choice, so any pairing strategy will select the same contact-agent pairing. On the other hand, when many agents and/or contacts are available, this yields a large number of pairing choices. The strategy for selecting among this large number of pairing choices can have a significant impact on performance. Accordingly, the difference between a high performing pairing strategy and a traditional pairing strategy generally increases with the number of contact-agent pairing choices. The relationship between the number of available pairing choices and performance is described in detail in, e.g., U.S. Pat. No. 10,257,354, which is incorporated by reference herein.

Consequently, to improve the performance of a high performing pairing strategy, it may be desirable to delay or otherwise postpone the selection of a contact-agent pairing between an agent and a contact when the number of pairing choices is too small to achieve the desired level of performance (e.g., when the number of pairing choices is below a predetermined threshold, or when the contact center system 200A and/or 200B is in the L1 or L2 state). Postponing the selection may provide time for new contacts to be added to the queue or more agents to become available, thereby increasing the number of pairing choices. In some embodiments, delaying the selection may allow the contact center system 200A and/or 200B to transition from an L1 or L2 state (where the number of pairing choices increases linearly with the number of contacts or agents) to an L3 state (where number of pairing choices increases super-linearly with the number of contacts or agents).

When a pairing strategy is implemented by internal pairing system 290, postponing the selection can be implemented by directly monitoring the state of a contact center system (e.g., contact center system 100 and/or contact center system 200A and/or 200B) and waiting until the number of pairing choices exceeds a threshold. See, e.g., U.S. Pat. No. 10,257,354. However, for pairing strategies implemented by the external pairing system 220, adding a period of delay may involve an exchange of communications over an API between external pairing system 220 and contact center system 200, in order to coordinate or share control between external pairing system 220 and internal pairing system 290.

Figure 3A:
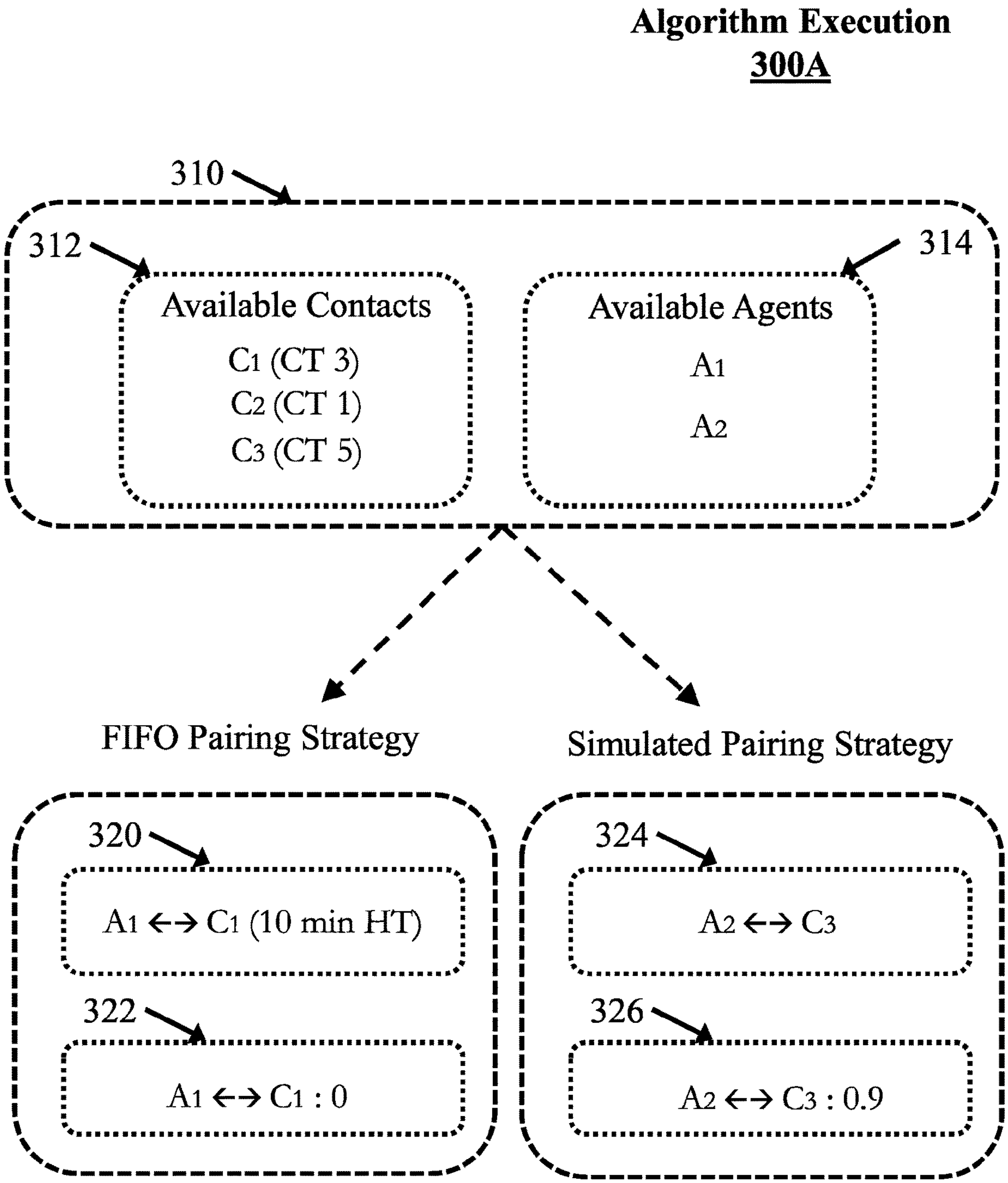
FIGS. 3A and 3B illustrate a flow chart demonstrating algorithm execution of an example contact-agent pairing sequence with a simulated contact-agent pairing sequence, in accordance with aspects of the present disclosure.
Figure 3B:
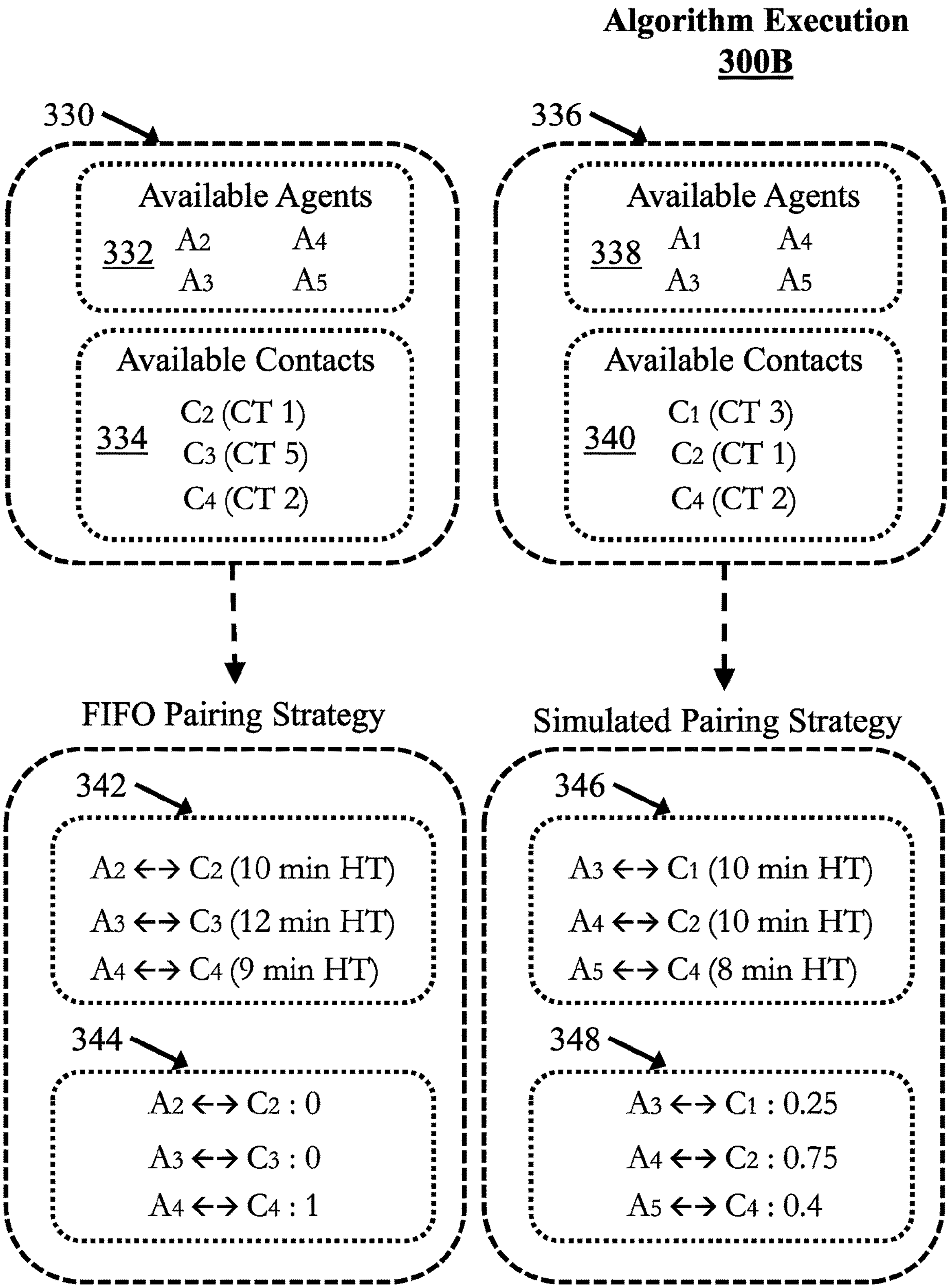

FIG. 3A illustrates a flow chart demonstrating a first algorithm execution 300A of an example contact-agent pairing sequence with a simulated contact-agent pairing sequence, in accordance with aspects of the present disclosure. Moreover, the simulated contact-agent pairings referenced herein may be additionally referenced as "hypothetical contact-agent pairings". Regardless, FIGS. 3A and 3B are provided herein to demonstrate how executing a simulation model to generate simulated contact-agent pairings in tandem with executing a live pairing strategy that generates actual contact-agent pairings may be implemented for a contact center system and how the different pairing strategies may impact operation of the contact center system based on different permutations of arrival times of the contacts, types of contacts, availability of agents, types of agents, and/or other information or data of the contact center system. Of course, the various pairing algorithms are examples only of types of pairing algorithms/strategies that may be used for sequences, simulated sequences, and/or otherwise simulations as described herein.

In any event, the simulated contact-agent pairing sequence of FIG. 3A generally includes a set of available contacts 312 and a set of available agents 314. At a first time 310, all/some of the set of available contacts 312 may be paired with an agent from the set of available agents 314, in accordance with two pairing strategies. In particular, the contact center systems described herein in reference to FIG. 1 (e.g., contact center system 100, pairing system 140, simulation model 150), 2A (e.g., contact center system 200A, internal pairing system 290, internal simulation model 295, external pairing system 220, external simulation model 225), and/or 2B (e.g., contact center system 200B) may analyze the set of available contacts 312 and the set of available agents 314 to determine one or more contact-agent pairings utilizing a FIFO pairing strategy, a BP pairing strategy, and/or any other pairing strategy used by the contact center system. Additionally, the contact center systems described herein may simultaneously generate one or more simulated contact-agent pairings utilizing a simulation model implementing a simulated pairing algorithm.

For example, and as illustrated in FIG. 3A, the contact center systems may execute a FIFO pairing strategy whereby a first available agent A1 is paired with a first available contact C1 in a first contact-agent pairing 320. The first available agent A1 and the first available contact C1 may be paired in accordance with the FIFO pairing strategy because the first available agent A1 and the first available contact C1 were, respectively, the first agent and the first contact present their respective queues waiting to be paired. As a result of this first contact-agent pairing 320, the contact center systems may establish a first connection between the first available agent A1 and the first available contact C1. In this manner, the FIFO pairing strategy may enable the first available agent A1 to conduct a conversation with the first available contact C1, and may further enable the first available agent A1 to address any questions, concerns, and/or other difficulties the first available contact C1 may have. The first available agent A1 may engage with the first available contact C1 for ten minutes (i.e., a ten-minute handle time (HT)), after which, the first available contact C1 and/or the first available agent A1 may disconnect from the first connection, and thereby conclude the conversation. A first outcome 322 of this first contact-agent pairing 320 may be recorded in an outcome storage location for use in future pairing determinations, agent evaluations, and/or any other suitable determinations.

More specifically, the contact center systems of the present disclosure may obtain, at the first time 310, the first set of available contacts 312 and the first set of available agents 314. The contact center systems may then determine the first contact-agent pairing 320 between the first available agent A1 and the first available contact C1 based on the first set of available contacts 312 and the first set of available agents 314 and a first pairing strategy (e.g., FIFO, BP, or any other pairing strategy used by the contact center system). One or more processors of the contact center systems may then establish the first connection between a first agent device and a first contact device for the first contact-agent pairing 320. When the first connection 320 is disconnected, the one or more processors may store a first set of pairing data corresponding to the first contact-agent pairing.

Generally, the first set of pairing data may be or include a contact identifier, an agent identifier, and/or a pairing strategy identifier. In the exemplary embodiment of FIG. 3A, the first set of pairing data may include a contact identifier corresponding to the first available contact C1, an agent identifier corresponding to the first available agent A1, and a pairing strategy identifier corresponding to the FIFO pairing strategy that resulted in the first contact-agent pairing between the first available contact C1 and the first available agent A1. Of course, it should be understood that the set of pairing data may include any suitable data. For example, the set of pairing data may include an outcome indicator (e.g., the first outcome 322), such as an indication of whether the contact-agent pairing resulted in a transaction, a handle time, and/or any other suitable indication or combinations thereof. In other examples, the outcome identifier and/or other information may be stored in a separate database (e.g., at the remote computing device 295) that is linked to the internal contact center systems. Similarly, the pairing strategy used may be any pairing strategy available to the contact center system (e.g., BP).

As another example, the first pairing strategy may be BP, and the second pairing strategy may be FIFO (or another incumbent pairing strategy of the contact center). Thus, in this example, the incumbent pairing strategy (FIFO) may be the simulated pairing strategy, such that the contact center may be implementing/testing the first pairing strategy to determine whether the incumbent pairing strategy should be replaced/adjusted/influenced by the first pairing strategy (and/or any other suitable pairing strategy or combinations thereof). The systems of the present disclosure may thereby allow a contact center owner to verify whether the first pairing strategy (BP) is a superior pairing strategy to the incumbent pairing strategy (FIFO) based on a comparison to real-time data indicating how the incumbent pairing strategy (FIFO) would have performed, if implemented. Accordingly, the systems and methods of the present disclosure allow the contact center owner to evaluate a new pairing strategy against an incumbent pairing strategy, without actually requiring the contact center to continue using the incumbent pairing strategy.

In other examples, the first pairing strategy may be tested against the simulated pairing strategy to determine whether the first pairing strategy should be replaced/adjusted/influenced by the data of how the simulated pairing strategy would have performed if the simulated pairing strategy were used instead of the first pairing strategy. For example, if a FIFO pairing strategy outperforms a BP strategy or a PBR strategy, then the BP/PBR strategy may be adjusted or influenced by the simulated pairing data. In another example, where the first pairing strategy is a BP strategy, a PBR strategy, or any other pairing strategy which manipulates pairings based on data about the contacts and agents instead of pairing contacts or agents in the order in which they became available, the collection of simulated pairing data based on a simulated pairing strategy, such as FIFO which pairs contacts or agents in the order in which they became available, may be used to train the first pairing strategy as simulated ground truth data. Therefore, the systems and methods of the present disclosure allow the contact center owner to evaluate and/or adjust pairing strategies against simulated pairing strategies, without actually requiring the contact center to use the simulated pairing strategy.

Further, and as previously mentioned, the contact center environment may generally be too dynamic for a comparison of current data using a first pairing strategy (e.g., BP) against prior (e.g., one day) data using a second pairing strategy (e.g., FIFO). Data collected from different time periods may typically result in substantial noise between the two data sets; therefore, the systems and methods of the present disclosure provide a more accurate comparison of the two pairing strategies than was previously achievable using conventional techniques that yielded significantly noisy data sets.

In any event, when the processors have stored the first set of pairing data and/or simultaneously with the processors executing the first pairing strategy (e.g., FIFO as shown in FIG. 3A, although the pairing strategy may be any other pairing strategy available to the contact center system) to generate the first contact-agent pairing, the one or more processors may execute a simulation model implementing a simulated pairing algorithm to generate a second contact-agent pairing 324 based on the first set of available contacts 312 and the first set of available agents 314 and a second pairing strategy. The second pairing strategy may be any suitable pairing strategy, such as BP. For example, in some embodiments, the pairing strategy utilized to establish the connection between a live agent and a contact may be a BP strategy and the simulated pairing strategy may be the FIFO pairing strategy. Of course, as previously mentioned, the simulation model may be or include executable instructions (e.g., the simulated pairing algorithm) configured to implement a pairing strategy (e.g., the second pairing strategy).

As illustrated in FIG. 3A, the contact center systems may execute the simulation model to identify a pairing comprising a second available agent A2 with a third available contact C3 in the second contact-agent pairing 324. The second available agent A2 and the third available contact C3 may be paired in accordance with the simulated pairing strategy because the second available agent A2 and the third available contact C3 may have a high likelihood of a successful/desirable outcome according to the simulated pairing strategy. However, unlike the first contact-agent pairing 320, the contact center systems may not establish a connection between the second available agent A2 and the third available contact C3 because the second contact-agent pairing 324 is a simulated pairing. Instead, the only live connection established at the first time 310 may be between the first available agent A1 and the first available contact C1 of the first contact-agent pairing 320. In this manner, the simulated contact-agent pairing illustrated in FIG. 3A may enable the contact center systems to simulate alternative pairings/pairing strategies simultaneously with live, actual pairings/pairing strategies to test/predict the validity of such alternative pairings/pairing strategies and/or the future state of the contact center system based on the simulated pairing strategy at any time during live operation of the contact center systems without actually requiring live operational use of the simulated pairing strategy.

For example, in the embodiment of FIG. 3A, the third available contact C3 has an associated contact type of 5, which may be a contact type that the second available agent A2 is historically adept at handling and/or otherwise interacting with, based on historical outcome data. This historical outcome data corresponding to past interactions between respective agents and contacts/contact types may indicate success rates of securing transactions during pairings, reduced handle times, and/or other performance measurements, and may be stored locally on the contact center systems and/or may be stored externally. In certain embodiments, the historical outcome data may be or include a numerical historical outcome indicator between zero and one to represent the percentage success rate of a particular agent with a particular contact type. Moreover, contact types may generally indicate that a particular contact typically has longer/shorter/average handle times, is more/less likely to perform a transaction, has been determined to be low/high priority, and/or any other suitable indications or combinations thereof. It is to be understood that additional contact types that are based on any suitable indications may also exist where each contact type may be classified, ordered, determined, and/or otherwise based on the corresponding pairing algorithm currently implemented by the contact center system.

In this example, contact type 5 may indicate that the third available contact C3 typically has shorter handle times and is more likely than most to engage in a transaction, and the second available agent A2 may have a higher than average (or higher than the first available agent A1) historical outcome indicator corresponding to contact type 5. Thus, the simulated pairing strategy may generate the second contact-agent pairing 324 between the second available agent A2 and the third available contact C3 because this pairing 324 has the highest predicted likelihood of a successful outcome of the available pairing scenarios between an agent from the first set of available agents 314 with a contact from the first set of available contacts 312.

As illustrated in FIG. 3A, the second contact-agent pairing 324 may be predicted to result in a successful second outcome 326. More specifically, the second contact-agent pairing 324 is predicted to result in a successful outcome (e.g., outcome indicator of 0.9) representing a transaction (sale) and/or any other suitable outcome metric or combinations thereof based on the historical outcome data of the second available agent A2 with contacts of contact type 5. For example, the processors of the contact center system may calculate the outcome indicator by evaluating the second available agent's A2 prior connections with contacts of contact type 5. In this example, the second available agent A2 may have successfully initiated/executed a transaction with contacts of contact type 5 during eighteen out of twenty total connections, resulting in a success rate of 90% or 0.9 (on a scale from zero to one). Accordingly, the predicted/simulated outcome indicator for pairing the second available agent A2 with the third available contact C3 may be 0.9. Thus, the second contact-agent pairing 324 is predicted to be more successful than the first contact-agent pairing 320 actually was, as the first outcome 322 has an outcome indicator of zero, meaning no transaction and/or other desired outcome was achieved as a result of the first contact-agent pairing 320.

When the simulation model has finished generating the second contact-agent pairing 324, the processors of the contact center systems may store a second set of pairing data corresponding to the second contact-agent pairing 324. This second set of pairing data may be similar to the first set of pairing data, in that the second set of pairing data may be or include a contact identifier, an agent identifier, and/or a pairing strategy identifier (e.g., an identification of the simulated pairing strategy). However, the second set of pairing data may also be or include a predicted outcome indicator corresponding to the predicted second outcome 326. In the exemplary embodiment of FIG. 3A, the second set of pairing data may include a contact identifier corresponding to the third available contact C3, an agent identifier corresponding to the second available agent A2, a pairing strategy identifier corresponding to the simulated pairing strategy that resulted in the second contact-agent pairing 324 between the third available contact C3 and the second available agent A2, and a predicted outcome indicator corresponding to the second outcome 326. In certain embodiments, the second set of pairing data may be or include a normalized performance rank for the agent included in the simulated contact-agent pairing (e.g., second available agent A2), a wait time for the agent and/or the contact, a skill value of the agent, and/or a priority value associated with the agent and/or the contact.

In certain embodiments, the first set of available agents 314 and the first set of available contacts 312 may include zero entries or a single entry. Further, in some embodiments, the first contact-agent pairing 320 may include a first contact and a first agent from the first set of available contacts 312 and the first set of available agents 314, and the second contact-agent pairing 324 may include the same first contact and the first agent from the first contact-agent pairing 320. Alternatively, in certain embodiments, the second contact-agent pairing 324 may include at least one of: (i) a second contact that is different from the first contact or (ii) a second agent that is different from the first agent. For example, the second contact-agent pairing 324 in FIG. 3A includes the second available agent A2 and the third available contact C3, which are both different from the first available agent A1 and the first available contact C1 in the first contact-agent pairing 320.

Additionally, the processors of the contact center systems may determine a performance measurement of the contact center system based on the first set of pairing data and the second set of pairing data. For example, in certain embodiments, the performance measurement may be or include (i) a number of differences between the first set of pairing data and the second set of pairing data, (ii) a percentage similarity value between the first set of pairing data and the second set of pairing data, (iii) an outcome difference value, (iv) a bandwidth value, (v) a throughput value, (vi) a handle time, (vii) a queue length value, (viii) an estimated waiting time or another value based on the contact's time in queue, (ix) a number of communication disconnections, (x) a service level agreement (SLA) satisfaction value, and/or any other suitable value(s) related to a contact center system or combinations thereof. The SLA satisfaction value may generally be or include a percentage, ratio, numerical value, score, and/or any other suitable value representing the rate at which a particular pairing strategy (or the difference between two pairing strategies) successfully pairs a contact with an agent within a threshold period of time (e.g., as indicated in an associated SLA). Further, the outcome difference value(s) may represent the numerical difference between the actual outcomes of the connected pairings (e.g., first contact-agent pairing 320) and the predicted outcomes of the simulated pairings (e.g., second contact-agent pairing 324).

To illustrate, at the first time 310 the first contact-agent pairing 320 resulted in a first outcome 322 with an outcome indicator of zero, meaning that the pairing between the first available agent A1 and the first available contact C1 did not result in a transaction or other suitable outcome. The second contact-agent pairing 324 is predicted to result in the second outcome 326 with an outcome indicator of 0.9, meaning that the pairing between the second available agent A2 and the third available contact C3 is predicted to result in a transaction or other suitable outcome. Thus, the performance measurement of the contact center may be based, in part, on the difference between the first outcome 322 indicator of zero and the second outcome 326 indicator of 0.9 (i.e., a −0.9 or 0.9 performance measurement at the first time 310). Based on this performance measurement, the internal/external contact center systems may update, change, and/or modify a pairing strategy and/or data entries corresponding to agents, contact types, pairing strategies, to improve the live pairings established by the pairing systems over time.

Further, in certain embodiments, the contact center systems may determine a set of historical contact-agent pairings based on one or more connected contact-agent pairings. In other words, the processors of the contact center systems may evaluate the prior sets of pairing data associated with prior contact-agent pairings that resulted in live connections between an agent device and a contact device to determine the set of historical contact-agent pairings. Similarly, the contact center systems may determine a set of simulated contact-agent pairings based on one or more simulated contact-agent pairings. Namely, the processors of the contact center systems may evaluate the prior sets of pairing data associated with prior simulated contact-agent pairings to determine the set of simulated contact-agent pairings. In these embodiments, the contact center systems may compare the set of historical contact-agent pairings and the set of simulated contact-agent pairings to determine a performance measurement based on the comparing.

For example, the processors of the contact center systems described herein may evaluate pairing data from a plurality of (e.g., 10, 50, 100, 1000, etc.) of prior, connected contact-agent pairings and a corresponding plurality of prior, simulated contact-agent pairings. Each of these prior, connected contact-agent pairings and prior, simulated contact-agent pairings may have a binary outcome indicator, which may generally represent whether the pairing was successful. Accordingly, the pairing strategies responsible for the prior, connected contact-agent pairings and the corresponding plurality of prior, simulated contact-agent pairings may have an associated conversion rate. This conversion rate may generally indicate a number/percentage/ratio and/or any other suitable value or combination thereof of pairings associated with each respective pairing strategy that were successful. For example, a first pairing strategy may have a conversion rate of 75%, indicating that 75% of the pairings established by the first pairing strategy were successful, and a second pairing strategy may have a conversion rate of 35%, indicating that 35% of the pairings established by the second pairing strategy were successful. In this example, the processors of the contact center systems described herein may compare these conversion rates to determine that the first pairing strategy is more successful than the second pairing strategy and should likely be utilized over the second pairing strategy. Thus, the processors of the contact center systems described herein may compare conversion rates of the respective pairing strategies to thereby determine which pairing strategy is and/or may likely be more/most successful. Of course, the processors of the contact center systems described herein may perform similar comparisons between pairing strategies for any suitable metric (e.g., conversion rate, queue length, wait time, SLA satisfaction value, bandwidth, throughput, handle time, a value based on the contact's time in queue, communication disconnections, etc.).

In certain embodiments, the processors of the contact center systems described herein may perform comparisons between pairing strategies on an outcome-by-outcome basis. For example, and as mentioned, the processors of the contact center systems described herein may evaluate pairing data from a plurality (e.g., 10, 50, 100, 1000, etc.) of prior, connected contact-agent pairings and a corresponding plurality of prior, simulated contact-agent pairings. This prior pairing data may include the outcome data associated with each connected contact-agent pairing and each simulated contact-agent pairing. The processors may compare the numerical outcome indicator associated with each prior, connected pairing with the corresponding prior, simulated pairing to determine a set of outcome differences. This set of outcome differences may include as many entries as there exist corresponding pairs of individual prior, connected contact-agent pairings and prior, simulated contact-agent pairings. To illustrate, the processors may evaluate 50 prior, connected contact-agent pairings and 50 corresponding prior, simulated contact-agent pairings, such that the set of outcome differences includes up to 50 entries. The processors may then determine a performance measurement based on the set of outcome differences through any suitable mathematical/statistical formulation. For example, the processors may calculate an average outcome difference value, a summed outcome difference value, a weighted average outcome difference value, and/or any other formulation or combinations thereof.

As a further example of the prior embodiment, the processors of the contact center systems may evaluate three prior, connected contact-agent pairings with outcome indicators of one, zero, and zero, respectively. The processors may also evaluate three prior, simulated contact-agent pairings with simulated outcome indicators of 0.75, 0.25, and 0.5, respectively. In this example, the processors may calculate an outcome difference value for each respective pair of connected/simulated contact-agent pairings to determine the set of outcome differences of 0.25, −0.25, and −0.5. Thus, the processors may determine an aggregate performance measurement by, for example, averaging the three outcome difference values for a performance measurement of approximately −0.167, indicating that the simulated contact-agent pairings were slightly preferable to the connected contact-agent pairings.

Of course, it should be appreciated that the comparison of outcome indicators for the prior, connected contact-agent pairings and the prior, simulated contact-agent pairings may be performed in any suitable manner. Further, it is to be understood that FIG. 3A provides only an example aspect of the first algorithm execution 300A, and that additional or different strategies, including different types or implementations of pairing strategies and/or simulation techniques may be executed.

FIG. 3B illustrates another flow chart demonstrating a second algorithm execution 300B continuing from the example contact-agent pairing sequence and the simulated contact-agent pairing sequence of FIG. 3A, in accordance with aspects of the present disclosure. In particular, FIG. 3B illustrates a pairing sequence taking place at a second time 330, 336 for both the first pairing strategy (e.g., FIFO pairing strategy) and the second, simulated pairing strategy (e.g., implemented by the simulation model). The first pairing strategy and the second, simulated pairing strategy reach the second time 330, 336 with different sets of available agents 332, 338 and different sets of available contacts 334, 340. The first pairing strategy previously paired the first available agent A1 with the first available contact C1, and the second, simulated pairing strategy paired the second available agent A2 with the third available contact C3. Accordingly, at the second time 330, the first pairing strategy may be tasked with pairing the third set of available agents 332 with the third set of available contacts 334; and at the second time 336, the second, simulated pairing strategy may be tasked with simulating pairings between the fourth set of available agents 338 and the fourth set of available contacts 340. Of course, in certain embodiments, the first pairing strategy may be any suitable strategy (e.g., FIFO, BP, PBR, etc.) and the second pairing strategy may be any suitable strategy (e.g., FIFO, BP, PBR, etc.).

The processors of the contact center systems may proceed to execute the first pairing strategy to generate contact-agent pairings between the third set of available agents 332 and the third set of available contacts 334. This pairing may result in the set of contact-agent pairings 342, wherein the second available agent A2 is paired/connected to the second available contact C2, the third available agent A3 is paired/connected to the third available contact C3, and the fourth available agent A4 is paired/connected to the fourth available contact C4. As illustrated in FIG. 3B, the set of contact-agent pairings 342 may have a corresponding set of outcomes 344, which may include respective outcome indicators indicating that only the pairing between the fourth available agent and the fourth available contact resulted in a successful transaction.

Simultaneously, the processors of the contact center systems may proceed to execute the second, simulated pairing strategy to generate simulated contact-agent pairings between the fourth set of available agents 338 and the fourth set of available contacts 340. This pairing may result in the set of simulated contact-agent pairings 346, wherein the third available agent A3 is paired/connected to the first available contact C1, the fourth available agent A4 is paired/connected to the second available contact C2, and the fifth available agent A5 is paired/connected to the fourth available contact C4. As illustrated in FIG. 3B, the set of simulated contact-agent pairings 346 may have a corresponding set of simulated outcomes 348, which may include respective outcome indicators indicating that the simulated contact-agent pairings have a variety of likely outcomes.

In this case, the simulated outcomes 348 may represent a maximum overall predicted performance of the contact center system at the second time 336. For example, given the fourth set of available agents 338 and the fourth set of available contacts 340, the simulation model may predict that the set of simulated contact-agent pairings 346 represents the highest possible likelihood of a successful outcome for a connection with each available contact. This highest possible likelihood may be on a contact-by-contact basis and/or may be on an aggregate basis. For example, the simulation model may predict that the sum of the outcome indicators represented in the set of simulated outcomes 348 (i.e., 1.4) may be the highest of all predicted sums of all permutations of pairings between the fourth set of available agents 338 and the fourth set of available contacts 340.

Additionally, or alternatively, the simulation model may generate the set of simulated contact-agent pairings 346 because the individual outcome indicators for each simulated pairing is the highest value that each contact may receive without too negatively impacting the outcome indicators for other contacts, based on the available agents in the fourth set of available agents 338. To illustrate, the first available contact C1 may have a predicted outcome indicator of 0.25 when paired with the third available agent and a predicted outcome indicator of 0.3 when paired with the fourth available agent. However, the second available contact may have a predicted outcome indicator of 0.75 when paired with the fourth available agent and a predicted outcome indicator of 0.4 or less when paired with any of the remaining available agents in the fourth set of available agents 338. Thus, because the benefit of pairing the second available contact C2 with the fourth available agent A4 exceeds the benefit of pairing the first available contact C1 with the fourth available agent A4, the simulation model may pair the first available contact C1 with the third available agent A3.

As further illustrated in FIG. 3B, the simulation model may generate predicted handle times as part of the simulated pairing strategy. For example, the simulated contact-agent pairing of the third available agent A3 with the first available contact C1 is predicted to have an approximately ten minute handle time, the simulated contact-agent pairing of the fourth available agent A4 with the second available contact C2 is predicted to have an approximately ten minute handle time, and the simulated contact-agent pairing of the fifth available agent A5 with the fourth available contact C4 is predicted to have an approximately eight minute handle time. In these instances where the simulation model generates a predicted handle time for the simulated contact-agent pairings, the predicted handle time may be included as part of the simulated pairing data, simulated outcome data, and/or any other suitable data set that may be stored at any suitable location locally or remotely relative to the contact center system.

When the processors of the contact center systems complete generation and/or establishment/connection of the set of contact-agent pairings 342 and the set of simulated contact-agent pairings 346, the processors may proceed to generate the performance measurement for the contact center system. In particular, the processors may proceed to compare the set of outcomes 344 to the simulated outcomes 348 by comparing the outcome indicators included as part of the set of outcomes 344 and the simulated outcomes 348. For example, the processors may determine that the first pairing strategy produced a less favorable outcome in two of the three connected pairings relative to the corresponding simulated pairings.

In some embodiments, the sets of available agents and contacts 332-340 are identical for the first pairing strategy and the second, simulated pairing strategy. In these embodiments, the processors of the contact center system may obtain, at a second time different from the first time 310, the second set of available contacts and available agents; determine a third contact-agent pairing based on the second set of available contacts and available agents and the first pairing strategy; establish a second connection for the third contact-agent pairing; and store a third set of pairing data corresponding to the third contact-agent pairing. Further in these embodiments, the processors may generate, by executing the simulation model, a fourth contact-agent pairing based on the second set of available contacts and available agents and the second pairing strategy; and store a fourth set of pairing data corresponding to the fourth contact-agent pairing. The processors may then determine a performance measurement of the contact center based on (i) the first set of pairing data associated with the first contact-agent pairing 320, (ii) the second set of pairing data associated with the second contact-agent pairing 324, (iii) the third set of pairing data, and/or (iv) the fourth set of pairing data.

In some embodiments, the processors of the contact center systems may obtain, at a second time different from the first time 310, a second set of available contacts and available agents; determine a third contact-agent pairing based on the second set of available contacts and available agents and the first pairing strategy; establish a second connection for the third contact-agent pairing; and store a third set of pairing data corresponding to the third contact-agent pairing. Further in these embodiments, the processors may generate, by executing the simulation model, (i) a set of hypothetical available contacts and available agents based on the first set of available contacts and agents and the second contact-agent pairing and (ii) a fourth contact-agent pairing based on the set of hypothetical available contacts and available agents and the second pairing strategy; and store a fourth set of pairing data corresponding to the fourth contact-agent pairing. The processors may then determine a performance measurement of the contact center based on (i) the first set of pairing data associated with the first contact-agent pairing 320, (ii) the second set of pairing data associated with the second contact-agent pairing 324, (iii) the third set of pairing data, and (iv) the fourth set of pairing data.

As illustrated in FIG. 3B, the sets of available agents 332, 338 and the sets of available contacts 334, 340 include different members based on the prior contact-agent pairings generated by the different pairing strategies. Consequently, it should be appreciated that the shared membership between the sets of available agents and contacts may diverge/change/reduce over time as the two different pairing strategies may generate different pairing combinations that may leave different agents and/or contacts in their respective queues waiting to be paired. This divergence may lead to significantly different contact-agent pairing possibilities and associated outcomes as the processors iteratively generate actual contact-agent pairings (e.g., contact-agent pairings 320, 342) and simulated contact-agent pairings (e.g., simulated contact-agent pairings 324, 346) over time.

In any event, and as described above, the contact center may be updated to operate based on the output of the simulation model in order to achieve the improved performance measurement(s) as determined by the simulated pairing strategy or algorithm. For example, in some aspects, a switch (e.g., any one of central switch 110, switch 120A, switch 120B, and/or switch 280, and/or otherwise equipment of the contact center system such as a PBX and/or ACD as described herein) of the contact center system may be configured to route at least a portion of one or more contacts based on the simulated pairing algorithm. By updating, or otherwise configuring, the contact center to use the simulated pairing algorithm, the contact center (and at least a portion of its underlying computing technology, e.g., connections and usage thereof) can be improved by a new, efficient algorithm as determined by the simulation model. Sill further, the simulation model, as improved by the simulation pairing algorithm, can allow the systems and methods of the contact center to operate with limited or reduced resources (e.g., limited or fewer telecommunication connections and/or limited or reduced processing or memory utilization of a call processing system) or experience increased performance (e.g., transaction completion or sales) compared with non-optimizing systems. Further, limited or fewer telecommunication connections and/or limited or reduced processing or memory utilization of a call processing system are achieved because the simulation efficiently determines contact center operation through simulation instead of through consuming live resources.

Figure 4:
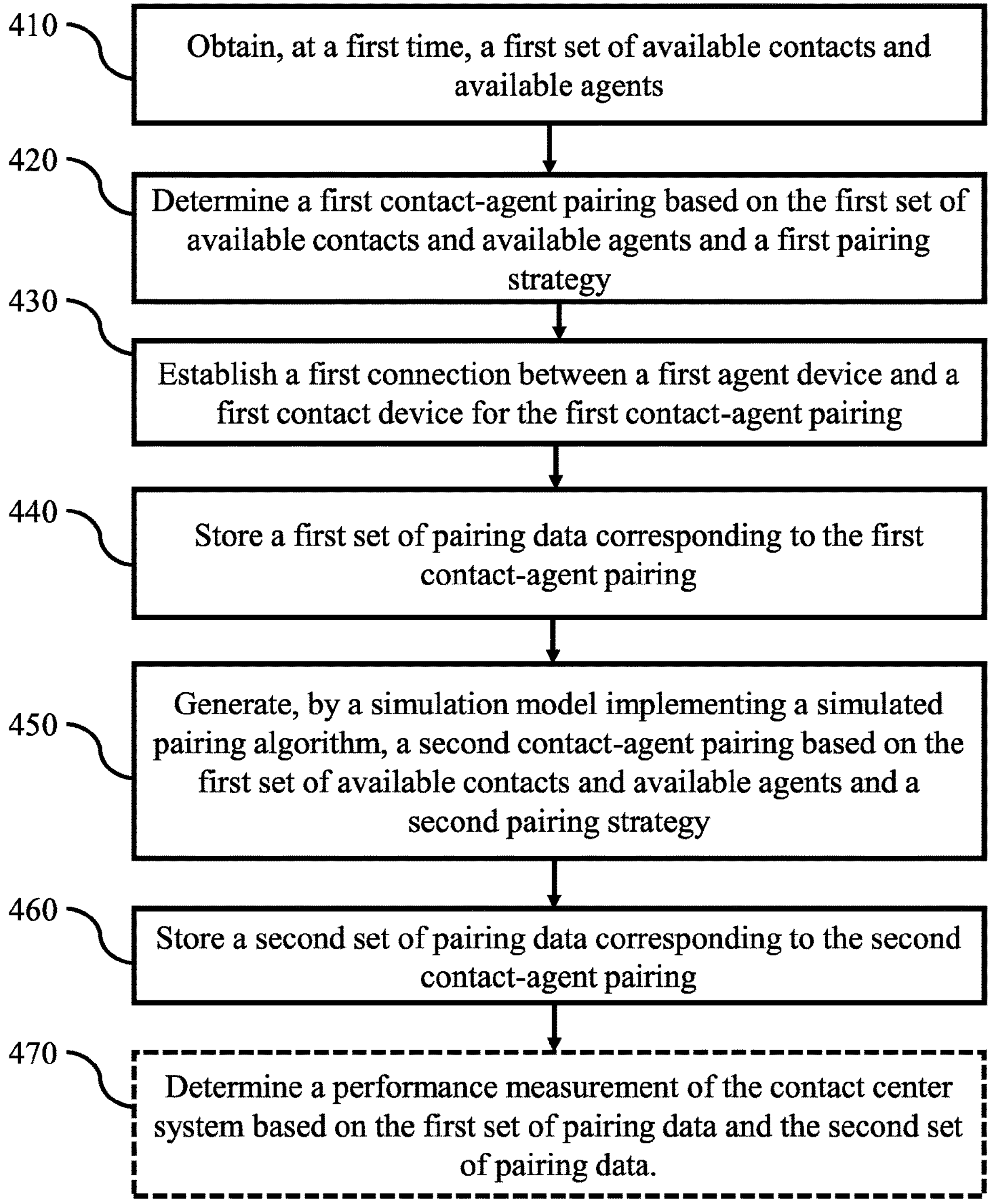
FIG. 4 illustrates a computer-implemented method for simulating contact-agent pairings and analyzing contact center performance based the simulated contact-agent pairings, in accordance with various aspects of the present disclosure.

FIG. 4 illustrates a computer-implemented method 400 for simulating contact-agent pairings and analyzing contact center performance based the simulated contact-agent pairings, in accordance with various aspects of the present disclosure. Computer-implemented method 400 comprises an algorithm or computing instructions as may be implemented in a contact center, or contact center system (e.g., contact center system 100, contact center system 200A, and/or contact center system 200B), and may involve the processing of input data and the generation of output data, both of which may comprise call center related data, including data regarding agents, contacts, (or events thereof, including arrival of contacts and/or availability of agents) and/or determination of performance measurements as described herein.

Input data and output data receipt, transmission, and/or generation involved as part of the computer-implemented method 400 may be implemented in hardware or software components of contact center system. For example, specific electronic components may be employed in a pairing algorithm, as implemented on one or more processors and/or memories of a contact center system, or similar or related circuitry for implementing the functions associated with simulations and/or contact-agent pairing in a contact center system (e.g., contact center system 100, contact center system 200A, and/or contact center system 200B). Additionally, one or more processors operating in accordance with computing instructions may implement the functions associated with contact-agent pairing and/or simulation in a contact center system (e.g., contact center system 100, contact center system 200A, and/or contact center system 200B) as described herein, including for computer-implemented method 400. Such instructions may be stored on one or more non-transitory processor readable storage media (e.g., a magnetic disk or other storage medium), or transmitted to one or more processors via one or more signals embodied in one or more carrier waves, for example, across one or more computer buses and/or computer networks. In various aspects, the one or more processors that implement the algorithm of computer-implemented method 400, or otherwise execute the computing instructions as described herein, may comprise one or more processors of a computing device of the contact center system itself, such as one or more processors of a computing device, server, router, or the like that is communicatively coupled to the contact center system.

With reference to FIG. 4, at block 410 the computer-implemented method 400 includes obtaining, at a first time by one or more processors communicatively coupled to a contact center system configured to distribute electronic inbound or outbound contacts, a first set of available contacts and available agents. At block 420, the computer-implemented method 400 includes determining a first contact-agent pairing based on the first set of available contacts and available agents and a first pairing strategy. At block 430, the computer-implemented method 400 includes establishing a first connection between a first agent device and a first contact device for the first contact-agent pairing.

At block 440, the computer-implemented method 400 includes storing a first set of pairing data corresponding to the first contact-agent pairing. At block 450, the computer-implemented method 400 includes generating, by a simulation model implementing a simulated pairing algorithm, a second contact-agent pairing based on the first set of available contacts and available agents and a second pairing strategy. At block 460, the computer-implemented method 400 includes storing a second set of pairing data corresponding to the second contact-agent pairing. At block 470, the computer-implemented method 400 optionally includes determining a performance measurement of the contact center system based on the first set of pairing data and the second set of pairing data.

Moreover, the computer-implemented method 400 may further include updating the contact center to operate based on the performance measurement simulated pairing algorithm. For example, in some aspects, a switch (e.g., any one of central switch 110, switch 120A, switch 120B, and/or switch 280, as described herein), the PBX, and/or the ACD of the contact center may be configured to route at least a portion of one or more contacts based on the simulated pairing algorithm and/or the performance measurement(s) generated thereby. By updating, or otherwise configuring, the contact center to use the simulated pairing algorithm, the contact center (and at least a portion of its underlying computing technology, e.g., connections and usage thereof) may be improved by a new, efficient pairing algorithm as determined by the simulation model. Further, in certain embodiments, the results of the simulated pairing algorithm may be used to train the currently implemented pairing strategy. In these circumstances, the contact center (and at least a portion of its underlying computing technology, e.g., connections and usage thereof) may be similarly improved by updating/re-training the incumbent/currently implemented pairing algorithm based on the results of the simulation model, thereby improving the performance (e.g., increased conversion rate and/or other metric values) of the incumbent/currently implemented pairing strategy.

Therefore, the simulation method 400 improves over the prior art at least because the disclosed simulation method tests new or modified pairing strategies without requiring actual telecommunication connections between live agents and live contacts. Such offline testing reduces processing and/or memory utilization of a contact processing system during contact center hours of operation. Additionally, the simulation method 400 evaluates new or modified pairing strategies by comparing performance measurements of the new or modified pairing strategies to historical contact center pairing strategies; this evaluation is much quicker than the hours, days, months, or years that testing the new or modified pairing strategies on live agents and live contacts would take. Further, when showing contact center performance data to an entity not associated with the contact center system, simulated data can be used to preserve information security of the actual (or historic) data.

In certain embodiments, the computer-implemented method 400 may further include obtaining, at a second time different from the first time, a second set of available contacts and available agents; determining a third contact-agent pairing based on the second set of available contacts and available agents and the first pairing strategy; establishing a second connection for the third contact-agent pairing; storing a third set of pairing data corresponding to the third contact-agent pairing; generating, by the simulation model, a fourth contact-agent pairing based on the second set of available contacts and available agents and the second pairing strategy; storing a fourth set of pairing data corresponding to the fourth contact-agent pairing; and determining a performance measurement of the contact center based on (i) the first set of pairing data, (ii) the second set of pairing data, (iii) the third set of pairing data, and (iv) the fourth set of pairing data.

In some embodiments, the computer-implemented method 400 may further include obtaining, at a second time different from the first time, a second set of available contacts and available agents; determining a third contact-agent pairing based on the second set of available contacts and available agents and the first pairing strategy; establishing a second connection for the third contact-agent pairing; storing a third set of pairing data corresponding to the third contact-agent pairing; generating, by the simulation model, (i) a set of hypothetical available contacts and available agents based on the first set of available contacts and agents and the second contact-agent pairing and (ii) a fourth contact-agent pairing based on the set of hypothetical available contacts and available agents and the second pairing strategy; storing a fourth set of pairing data corresponding to the fourth contact-agent pairing; and determining a performance measurement of the contact center based on (i) the first set of pairing data, (ii) the second set of pairing data, (iii) the third set of pairing data, and (iv) the fourth set of pairing data.

In certain embodiments, the first contact-agent pairing may include a first contact and a first agent from the first set of available contacts and available agents. Further in these embodiments, the second contact-agent pairing may include the first contact and the first agent.

In some embodiments, the first contact-agent pairing may include a first contact and a first agent from the first set of available contacts and available agents. Further in these embodiments, the second contact-agent pairing may include at least one of: (i) a second contact that is different from the first contact or (ii) a second agent that is different from the first agent.

In certain embodiments, the first pairing strategy may be a behavioral pairing (BP) strategy and the second pairing strategy may be a first-in, first-out (FIFO) pairing strategy. In other embodiments, the first pairing strategy may be a FIFO pairing strategy and the second pairing strategy may be a BP strategy. In still other embodiments, the first pairing strategy may be a BP pairing strategy and the second pairing strategy may be a PBR pairing strategy, and vice versa. That is, any combination of pairing strategies used in contact center environments may comprise the first pairing strategy and the second pairing strategy.

In some embodiments, the computer-implemented method 400 may further include determining a performance measurement of the contact center system based on the first set of pairing data and the second set of pairing data.

In certain embodiments, the computer-implemented method 400 may further include: determining a set of historical contact-agent pairings based on one or more connected contact-agent pairings; determining a set of simulated contact-agent pairings based on one or more simulated contact-agent pairings; comparing the set of historical contact-agent pairings and the set of simulated contact-agent pairings; and determining a performance measurement based on the comparing.

Figure 5:
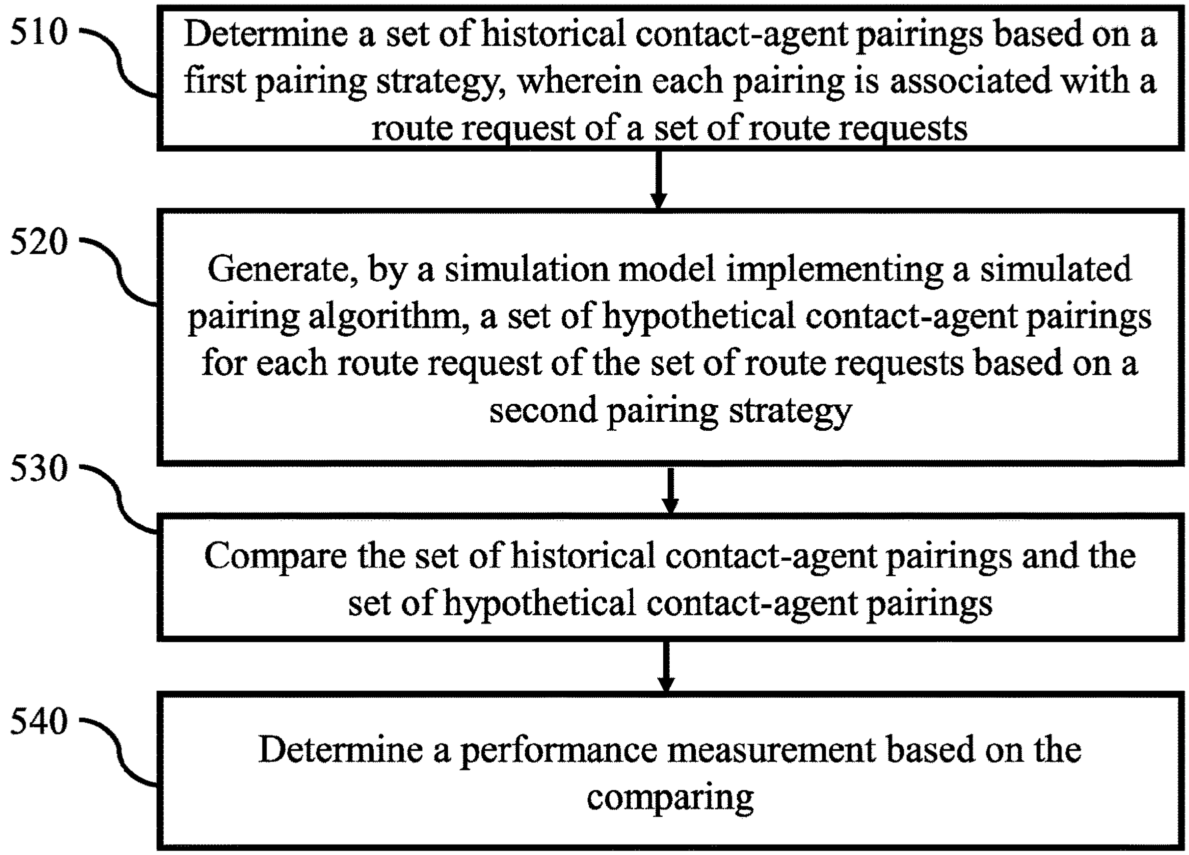
FIG. 5 illustrates another computer-implemented method for simulating contact-agent pairings and analyzing contact center performance based the simulated contact-agent pairings, in accordance with various aspects of the present disclosure.

FIG. 5 illustrates another computer-implemented method 500 for simulating contact-agent pairings and analyzing contact center performance based the simulated contact-agent pairings, in accordance with various aspects of the present disclosure. Computer-implemented method 500 comprises an algorithm or computing instructions as may be implemented in a contact center, or contact center system (e.g., contact center system 100, contact center system 200A, and/or contact center system 200B), and may involve the processing of input data and the generation of output data, both of which may comprise call center related data, including data regarding agents, contacts, (or events thereof, including arrival of contacts and/or availability of agents) and/or determination of performance measurements as described herein.

Input data and output data receipt, transmission, and/or generation involved as part of the computer-implemented method 500 may be implemented in hardware or software components of contact center system. For example, specific electronic components may be employed in a pairing algorithm, as implemented on one or more processors and/or memories of a contact center system, or similar or related circuitry for implementing the functions associated with simulations and/or contact-agent pairing in a contact center system (e.g., contact center system 100, contact center system 200A, and/or contact center system 200B). Additionally, one or more processors operating in accordance with computing instructions may implement the functions associated with contact-agent pairing and/or simulation in a contact center system (e.g., contact center system 100, contact center system 200A, and/or contact center system 200B) as described herein, including for computer-implemented method 500. Such instructions may be stored on one or more non-transitory processor readable storage media (e.g., a magnetic disk or other storage medium), or transmitted to one or more processors via one or more signals embodied in one or more carrier waves, for example, across one or more computer buses and/or computer networks. In various aspects, the one or more processors that implement the algorithm of computer-implemented method 500, or otherwise execute the computing instructions as described herein, may comprise one or more processors of a computing device of the contact center system itself, such as one or more processors of a computing device, server, router, or the like that is communicatively coupled to the contact center system.

With reference to FIG. 5, at block 510 the computer-implemented method 500 includes determining, by one or more processors communicatively coupled to a contact center system configured to distribute electronic inbound or outbound contacts, a set of historical contact-agent pairings based on a first pairing strategy. Generally, each pairing may be associated with a route request of a set of route requests. At block 520, the computer-implemented method 500 may include generating, by a simulation model implementing a simulated pairing algorithm, a set of hypothetical contact-agent pairings for each route request of the set of route requests based on a second pairing strategy. The set of hypothetical contact-agent pairings may include at least one hypothetical contact-agent pairing.

At block 530, the computer-implemented method 500 may include comparing the set of historical contact-agent pairings and the set of hypothetical contact-agent pairings. At block 540, the computer-implemented method 500 may include determining a performance measurement based on the comparing.

Additional Considerations

The present techniques may involve the processing of input data and the generation of output data to some extent. This input data processing and output data generation may be implemented in hardware or software. For example, specific electronic components may be employed in a behavioral pairing module or similar or related circuitry for implementing the functions associated with contact assignment in accordance with the present disclosure as described above. Alternatively, one or more processors operating in accordance with instructions may implement the functions associated with contact assignment in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The description herein describes network elements, computers, and/or components that may include one or more modules. As used herein, the term "module" may be understood to refer to computing software, firmware, hardware, and/or various combinations thereof. Modules, however, are not to be interpreted as software which is not implemented on hardware, firmware, or recorded on a non-transitory processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

The present disclosure is not to be limited in scope by the specific aspects described herein. Indeed, other various aspects of and modifications to the present disclosure, in addition to those described herein, will be apparent to those of ordinary skill in the art from the foregoing description and accompanying drawings. Thus, such other aspects and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes.

What is claimed is:

1. A computer-implemented method for simulating contact-agent pairings and analyzing contact center performance based on the simulated contact-agent pairings, the computer-implemented method comprising:

obtaining, at a first time by one or more processors communicatively coupled to a contact center system configured to distribute electronic inbound or outbound contacts, a first set of available contacts and available agents;

determining, by the one or more processors, a first contact-agent pairing based on the first set of available contacts and available agents and a first pairing strategy;

establishing, by the one or more processors, a first connection between a first agent device and a first contact device for the first contact-agent pairing;

storing, by the one or more processors, a first set of pairing data corresponding to the first contact-agent pairing;

generating, by a simulation model implementing a simulated pairing algorithm as executing on the one or more processors, a second contact-agent pairing based on the first set of available contacts and available agents and a second pairing strategy; and storing, by the one or more processors, a second set of pairing data corresponding to the second contact-agent pairing.

2. The computer-implemented method of claim 1, further comprising:

obtaining, by the one or more processors at a second time different from the first time, a second set of available contacts and available agents;

determining, by the one or more processors, a third contact-agent pairing based on the second set of available contacts and available agents and the first pairing strategy;

establishing, by the one or more processors, a second connection for the third contact-agent pairing;

storing, by the one or more processors, a third set of pairing data corresponding to the third contact-agent pairing;

generating, by the simulation model as executing on the one or more processors, a fourth contact-agent pairing based on the second set of available contacts and available agents and the second pairing strategy;

storing, by the one or more processors, a fourth set of pairing data corresponding to the fourth contact-agent pairing; and determining, by the one or more processors, a performance measurement of the contact center based on (i) the first set of pairing data, (ii) the second set of pairing data, (iii) the third set of pairing data, and (iv) the fourth set of pairing data.

3. The computer-implemented method of claim 1, further comprising:

obtaining, by the one or more processors at a second time different from the first time, a second set of available contacts and available agents;

determining, by the one or more processors, a third contact-agent pairing based on the second set of available contacts and available agents and the first pairing strategy;

establishing, by the one or more processors, a second connection for the third contact-agent pairing;

storing, by the one or more processors, a third set of pairing data corresponding to the third contact-agent pairing;

generating, by the simulation model as executing on the one or more processors, (i) a set of hypothetical available contacts and available agents based on the first set of available contacts and agents and the second contact-agent pairing and (ii) a fourth contact-agent pairing based on the set of hypothetical available contacts and available agents and the second pairing strategy;

storing, by the one or more processors, a fourth set of pairing data corresponding to the fourth contact-agent pairing; and determining, by the one or more processors, a performance measurement of the contact center based on (i) the first set of pairing data, (ii) the second set of pairing data, (iii) the third set of pairing data, and (iv) the fourth set of pairing data.

4. The computer-implemented method of claim 1, wherein:

the first contact-agent pairing includes a first contact and a first agent from the first set of available contacts and available agents, and the second contact-agent pairing includes the first contact and the first agent.

5. The computer-implemented method of claim 1, wherein:

the first contact-agent pairing includes a first contact and a first agent from the first set of available contacts and available agents, and the second contact-agent pairing includes at least one of: (i) a second contact that is different from the first contact or (ii) a second agent that is different from the first agent.

6. The computer-implemented method of claim 1, wherein the first pairing strategy is a behavioral pairing (BP) strategy and the second pairing strategy is a first-in, first-out (FIFO) pairing strategy.

7. The computer-implemented method of claim 1, further comprising:

determining, by the one or more processors, a performance measurement of the contact center system based on the first set of pairing data and the second set of pairing data.

8. The computer-implemented method of claim 1, further comprising:

determining, by the one or more processors, a set of historical contact-agent pairings based on one or more connected contact-agent pairings; and determining, by the one or more processors, a set of simulated contact-agent pairings based on one or more simulated contact-agent pairings.

9. The computer-implemented method of claim 8, further comprising:

comparing, by the one or more processors, the set of historical contact-agent pairings and the set of simulated contact-agent pairings; and determining, by the one or more processors, a performance measurement based on the comparing.

10. A computer-implemented method for simulating contact-agent pairings and analyzing contact center performance based on the simulated contact-agent pairings, the computer-implemented method comprising:

determining, by one or more processors communicatively coupled to a contact center system configured to distribute electronic inbound or outbound contacts, a set of historical contact-agent pairings based on a first pairing strategy, wherein each pairing is associated with a route request of a set of route requests;

generating, by a simulation model implementing a simulated pairing algorithm executing on the one or more processors, a set of hypothetical contact-agent pairings for each route request of the set of route requests based on a second pairing strategy, the set of hypothetical contact-agent pairings including at least one hypothetical contact-agent pairing;

comparing, by the one or more processors, the set of historical contact-agent pairings and the set of hypothetical contact-agent pairings; and determining, by the one or more processors, a performance measurement based on the comparing.

11. The computer-implemented method of claim 10, wherein the first pairing strategy is a behavioral pairing (BP) strategy and the second pairing strategy is a first-in, first-out (FIFO) pairing strategy.

12. A system configured to simulate contact-agent pairings and to analyze contact center performance based on the simulated contact-agent pairings, the system comprising:

one or more processors communicatively coupled to a contact center system configured to distribute electronic inbound or outbound contacts; and computing instructions, configured for execution by the one or more processors, and that when executed by the one or more processors, cause the one or more processors to:

obtain, at a first time, a first set of available contacts and available agents, determine a first contact-agent pairing based on the first set of available contacts and available agents and a first pairing strategy, establish a first connection between a first agent device and a first contact device for the first contact-agent pairing, store a first set of pairing data corresponding to the first contact-agent pairing, generate, by a simulation model implementing a simulated pairing algorithm, a second contact-agent pairing based on the first set of available contacts and available agents and a second pairing strategy, and store a second set of pairing data corresponding to the second contact-agent pairing.

13. The system of claim 12, wherein the computing instructions, when executed, further cause the one or more processors to:

determine a performance measurement of the contact center based on the first set of pairing data and the second set of pairing data.

14. The system of claim 13, wherein the computing instructions, when executed, further cause the one or more processors to:

obtain, at a second time different from the first time, a second set of available contacts and available agents;

determine a third contact-agent pairing based on the second set of available contacts and available agents and the first pairing strategy;

establish a second connection for the third contact-agent pairing;

store a third set of pairing data corresponding to the third contact-agent pairing;

generate, by the simulation model, a fourth contact-agent pairing based on the second set of available contacts and available agents and the second pairing strategy;

store a fourth set of pairing data corresponding to the fourth contact-agent pairing; and determine an updated performance measurement of the contact center based on (i) the third set of pairing data, (ii) the fourth set of pairing data, and (iii) the performance measurement.

15. The system of claim 13, wherein the computing instructions, when executed, further cause the one or more processors to:

obtain, at a second time different from the first time, a second set of available contacts and available agents;

determine a third contact-agent pairing based on the second set of available contacts and available agents and the first pairing strategy;

establish a second connection for the third contact-agent pairing;

store a third set of pairing data corresponding to the third contact-agent pairing;

generate, by the simulation model, (i) a set of hypothetical available contacts and available agents based on the first set of available contacts and agents and the second contact-agent pairing and (ii) a fourth contact-agent pairing based on the set of hypothetical available contacts and available agents and the second pairing strategy;

store a fourth set of pairing data corresponding to the fourth contact-agent pairing; and determine an updated performance measurement of the contact center based on (i) the third set of pairing data, (ii) the fourth set of pairing data, and (iii) the performance measurement.

16. The system of claim 12, wherein:

the first contact-agent pairing includes a first contact and a first agent from the first set of available contacts and available agents, and the second contact-agent pairing includes the first contact and the first agent.

17. The system of claim 12, wherein:

the first contact-agent pairing includes a first contact and a first agent from the first set of available contacts and available agents, and the second contact-agent pairing includes at least one of: (i) a second contact that is different from the first contact or (ii) a second agent that is different from the first agent.

18. The system of claim 12, wherein the first pairing strategy is a behavioral pairing (BP) strategy and the second pairing strategy is a first-in, first-out (FIFO) pairing strategy.

19. The system of claim 12, wherein the computing instructions, when executed, further cause the one or more processors to:

determine a performance measurement of the contact center system based on the first set of pairing data and the second set of pairing data.

20. The system of claim 12, wherein the computing instructions, when executed, further cause the one or more processors to:

determine a set of historical contact-agent pairings based on one or more connected contact-agent pairings;

determine a set of simulated contact-agent pairings based on one or more simulated contact-agent pairings;

compare the set of historical contact-agent pairings and the set of simulated contact-agent pairings; and determine a performance measurement based on the comparing.

* * * * *